United States Patent
Mitani et al.

(10) Patent No.: US 6,295,253 B1
(45) Date of Patent: Sep. 25, 2001

(54) MAGNETOOPTICAL DISK UNIT CAPABLE OF RECORDING OR REPRODUCING SIGNALS HAVING DIFFERENT DOMAIN LENGTHS UNDER THE SAME CONDITIONS, SIGNAL RECORDING METHOD AND SIGNAL REPRODUCING METHOD

(75) Inventors: Kenichiro Mitani, Anpachi-gun; Naoyuki Takagi, Fuwa-gun; Hitoshi Noguchi, Gifu; Atsushi Yamaguchi, Motosu-gun; Hiroki Ishida, Anpachi-gun, all of (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 09/666,549

(22) Filed: Sep. 21, 2000

(30) Foreign Application Priority Data

Sep. 24, 1999 (JP) .................................. 11-270841
Oct. 5, 1999 (JP) .................................. 11-283714

(51) Int. Cl.$^7$ .............................. G11B 11/00; G11B 7/24
(52) U.S. Cl. .......................................... 369/13; 369/275.3
(58) Field of Search .................................. 369/13, 275.3, 369/275.1, 59.1, 124.01, 47.1, 47.15, 53.11; 360/40, 49, 48

(56) References Cited

U.S. PATENT DOCUMENTS 5,598,389 * 1/1997 Nakano et al. .................... 369/48
5,604,725 * 2/1997 Fuji .................................. 369/275.3

* cited by examiner

*Primary Examiner*—Ali Neyzari
(74) *Attorney, Agent, or Firm*—Armstrong, Westerman, Hattori, McLeland & Naughton, LLP

(57) ABSTRACT

When recording a recorded signal consisting of "01011001110" in a magnetooptical recording medium, (1,1) corresponding to a domain of 2T is converted to (1,0,1), and (0,0) is converted to (0,1,0) in the recorded signal. In other words, the first "1" of (1,1) is converted to unit bits "1,0" and the first "0" of (0,0) is converted to unit bits "0,1". Similarly, the first "1" of (1,1,1) corresponding to a domain of 3T is converted to unit bits "1,0", and the second "1" is converted to unit bits "1,0". "1" or "0" of the final unit bit is not converted but recorded as such. Consequently, a signal can be correctly reproduced by extension ally transferring domains having different domain lengths from a recording layer to a reproducing layer under the same reproducing conditions.

13 Claims, 21 Drawing Sheets

FIG.1A (a)
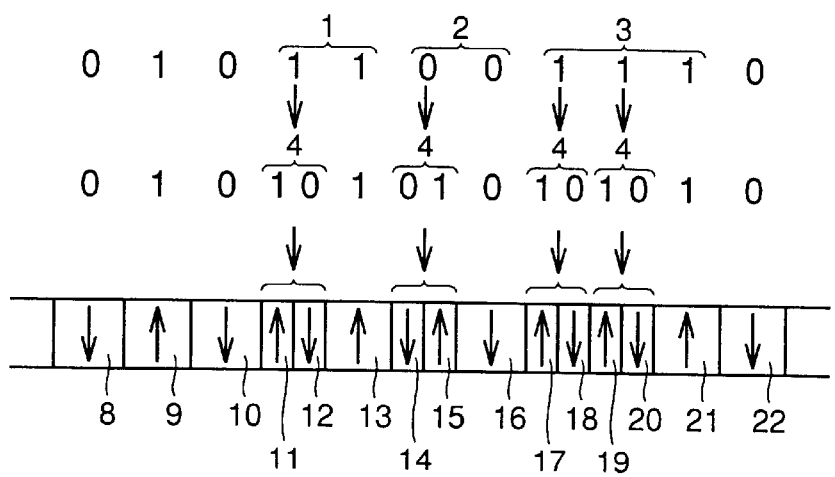
FIG.1B (b)
FIG.1C (c)
FIG.1D (d)
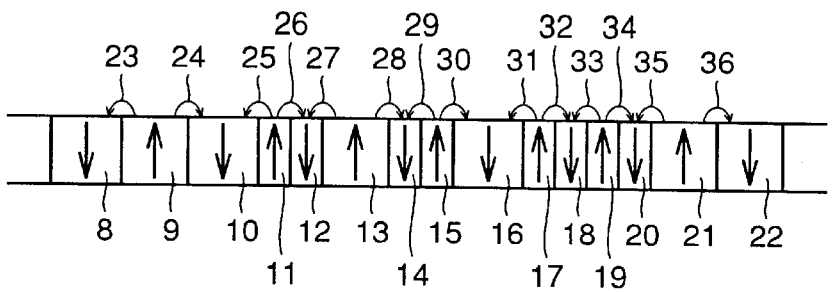

FIG.2C (f), (g), (CK)

MAGNETOOPTICAL DISK UNIT CAPABLE OF RECORDING OR REPRODUCING SIGNALS HAVING DIFFERENT DOMAIN LENGTHS UNDER THE SAME CONDITIONS, SIGNAL RECORDING METHOD AND SIGNAL REPRODUCING METHOD

TITLE OF THE INVENTION

Magnetooptical Disk Unit Capable of Recording or Reproducing Signals having Different Domain Lengths under the Same Conditions, Signal Recording Method and Signal Reproducing Method

BACKGROUND OF THE INVENTION

1. Field of the Invention

The present invention relates to a magnetooptical disk unit recording and reproducing signals in and from a magnetooptical recording medium, a signal recording method and a signal reproducing method.

2. Description of the Prior Art

A magnetooptical recording medium is watched with interest as a reloadable recording medium having a large storage capacity and high reliability, and now being put into practice as a computer memory or the like. Further, a magnetooptical recording medium having a storage capacity of 6.0 Gbytes is standardized under AS-MO (advanced storaged magnetooptical disk) standards, to be put into practice.

In addition, a magnetooptical recording medium having a recording capacity of 14 Gbytes is proposed according to an extensional magnetic domain reproducing system for extensionally transferring magnetic domains from a recording layer to a reproducing layer.

Referring to FIGS. 14A to 14C, a signal "01011001110" is recorded in a magnetooptical recording medium according to such an extensional magnetic domain reproducing system by applying an external magnetic field to the magnetooptical recording medium thereby forming domains 500 by "0", a domain 501 by "1", a domain 502 by "11", a domain 503 by "00" and a domain 504 by "111" respectively.

The signal is reproduced by irradiating the magnetooptical recording medium with a laser beam and applying an alternating magnetic field 505 of ±300 Oe thereby extensionally transferring each magnetic domain of a recording layer formed as a domain to a reproducing layer. In this case, the alternating magnetic field 505 is applied to central portions of respective domains having different domain lengths, such as the domain 501 having the minimum domain length and the domain 502 having a domain length 2T, for example.

In the conventional reproducing method, however, a leakage magnetic field 506 from the domain 501 having the minimum domain length and a leakage magnetic field 507 from the domain 502 having the domain length 2T are different from each other and hence the domains 501 and 502 are irradiated with the laser beam at different intensity levels. In order to reproduce the signal, therefore, the intensity of the laser beam must be varied with the domain lengths.

The intensity of the leakage magnetic field 506 from the domain 501 having the minimum domain length is increased from both ends toward the central portion of the domain 501, while the intensity of the leakage magnetic field 507 from the domain 502 having the domain length 2T is increased on both ends of the domain 502 and reduced on the central portion. Thus, the domain 501 is readily extensionally transferred from the recording layer to the reproducing layer when the alternating magnetic field 505 is applied to the central portion of the domain 501. However, it is difficult to extensionally transfer the domain 502 from the recording layer to the reproducing layer due to the small intensity of the leakage magnetic field 507 on the central portion. In order to extensionally transfer the domain 502 to the reproducing layer, therefore, the intensity of the laser beam applied to the domain 502 must be increased for increasing the intensity of the leakage magnetic field 507 on the central portion of the domain 502. Consequently, the intensity of the applied laser beam must be increased in proportion to the domain length. Some domain may not be extensionally transferred to the reproducing layer even if the intensity of the applied laser beam is increased, depending on the domain length.

SUMMARY OF THE INVENTION

Accordingly, an object of the present invention is to provide a magnetooptical disk unit recording a signal in a magnetooptical recording medium to be capable of correctly reproducing the signal by extensionally transferring domains having different domain lengths from a recording layer to a reproducing layer under the same reproducing conditions and reproducing the recorded signal, a signal recording method and a signal reproducing method.

According to a first aspect of the present invention, a magnetooptical disk unit for recording a recorded signal having a signal of n bits consisting of 1s and a signal of m bits consisting of 0s arranged in a prescribed system in a magnetooptical recording medium includes a signal conversion circuit converting each of first to n–1-th 1s forming the signal of n bits to (1,0) having a unit bit length when n is at least 2 and converting each of first to m–1-th 0s forming the signal of m bits to (0,1) having a unit bit length when m is at least 2.

The magnetooptical disk unit according to the first aspect records the signal in the magnetooptical recording medium while converting the first to n–1-th "1"s excluding the last one of the continuous "1"s to (1,0) formed by "1" and "0" shorter than the unit bit length when at least two "1"s forming the recorded signal continue and converting the first to m–1-th "0"s excluding the last one of the continuous "0"s to (0,1) formed by "0" and "1" shorter than the unit bit length when at least two "0"s forming the recorded signal continue. In other words, the signal of n bits consisting of 1s is recorded as 2×(n–1)+1=2n–1 (n≧2) domains having alternately arranged "1"s and "0"s, and the signal of m bits consisting of "0"s is recorded as 2m–1 (m≧2) domains having alternately arranged "0"s and "1"s. A signal of "1" or "0" corresponding to the minimum domain length is recorded as general.

According to the first aspect of the present invention, therefore, extensional transfer is caused from ends of domains to a reproducing layer when applying an alternating magnetic field including an in-plane component of the magnetooptical recording medium around the boundaries between the domains for reproducing a signal from the magnetooptical recording medium so that a reproduced signal having peaks corresponding to the length of the domains formed on the magnetooptical recording medium such as a reproduced signal having two peaks for domains of 2T, for example, is detected. Thus, the signal can be reproduced under constant reproducing conditions regardless of the domain length.

According to a second aspect of the present invention, a magnetooptical disk unit recording a recorded signal having a signal of n bits consisting of 1s and a signal of m bits consisting of 0s arranged in a prescribed system in a magnetooptical recording medium includes a magnetic head, a signal conversion circuit and a drive signal generation circuit. The magnetic head applies a magnetic field to the magnetooptical recording medium. The signal conversion circuit converts each of first to n−1-th 1s forming the signal of n bits to (1,0) having a unit bit length when n is at least 2, and converts each of first to m−1-th 0s forming the signal of m bits to (0,1) having a unit bit length when is at least 2. The drive signal generation circuit generates a drive signal for driving the magnetic head in response to an output signal from the signal conversion circuit.

In the magnetooptical disk unit according to the second aspect, the signal conversion circuit converts the first to n−1-th "1"s excluding the last one of the continuous "1"s to (1,0) formed by "1" and "0" shorter than the unit bit length when at least two "1"s forming the recorded signal continue, and converts the first to m−1-th "0"s excluding the last one of the continuous "0"s to (0,1) formed by "0" and "1" shorter than the unit bit length when at least two "0"s forming the recorded signal continue. The magnetic field applied from the magnetic head to the magnetooptical recording medium is modulated on the basis of the recorded signal converted by the signal conversion circuit, for recording the recorded signal in the magnetooptical recording medium.

According to the second aspect of the present invention, therefore, the signal of n bits consisting of 1s is recorded in the magnetooptical recording medium as 2×(n−1)+1=2n−1 (n≧2) domains having alternately arranged "1"s and "0"s and the signal of m bits consisting of 0s is recorded in the magnetooptical recording medium as 2m−1 (m≧2) domains having alternately arranged "0"s and "1"s in a magnetic field modulation system, whereby domains expressing "1" and "0" respectively can be alternately correctly formed by domains having a domain length shorter than the unit bit length. Consequently, a reproduced signal having peaks in a number corresponding to the domain length is detected in signal reproduction, so that the signal can be correctly reproduced under constant reproducing conditions regardless of the domain length.

According to a third aspect of the present invention, a magnetooptical disk unit recording a recorded signal having a signal of n bits consisting of 1s and a signal of m bits consisting of 0s arranged in a prescribed system in a magnetooptical recording medium includes a magnetic head, a detection circuit, a signal conversion circuit and a drive signal generation circuit. The magnetic head applies a magnetic field to the magnetooptical recording medium. The detection circuit detects 1 or 0 from the recorded signal and outputs a first detection signal corresponding to 1 and a second detection signal corresponding to 0. The signal conversion circuit converts each of first to n−1-th 1s forming the signal of n bits to (1,0) having a unit bit length when the detection circuit continuously outputs the first detection signal n times (n≧2), and converts each of first to m−1-th 0s forming the signal of m bits to (0,1) having a unit bit length when the detection circuit continuously outputs the second detection signal m times (m≧2). The drive signal generation circuit generates a drive signal for driving the magnetic head in response to an output signal from the signal conversion circuit.

In the magnetooptical disk unit according to the third aspect, the signal conversion circuit converts each of the first to n−1-th 1s forming the signal of n bits to (1,0) having the unit bit length when the detection circuit continuously outputs the first detection signal n times (n≧2) and converts each of the first to m−1-th 0s forming the signal of m bits to (0, 1) having the unit bit length when the detection circuit continuously outputs the second detection signal m times (m≧2). The converted recorded signal is recorded in the magnetooptical recording medium in the magnetic field modulation system.

According to the third aspect of the present invention, therefore, the signal conversion circuit can correctly convert a signal of at least two bits to a signal consisting of "1" and "0" shorter than the unit bit length. Further, domains expressing "1" and "0" respectively can be alternately correctly formed by domains having a domain length shorter than the unit bit length by the magnetic field modulation system. Consequently, a reproduced signal having peaks in a number corresponding to the domain length is detected in signal reproduction, so that the signal can be correctly reproduced under constant reproducing conditions regardless of the domain length.

According to a fourth aspect of the present invention, a magnetooptical disk unit recording a recorded signal having a signal of n bits consisting of 1s and a signal of m bits consisting of 0s arranged in a prescribed system in a magnetooptical recording medium includes a magnetic head, an external synchronizing signal generation circuit, a timing signal generation circuit, a detection circuit, a signal conversion circuit and a drive signal generation circuit. The magnetic head applies a magnetic field to the magnetooptical recording medium. The external synchronizing signal generation circuit generates an external synchronizing signal on the basis of a shape formed on the magnetooptical recording medium. The timing signal generation circuit generates a first timing signal synchronous with the external synchronizing signal generated by the external synchronizing signal generation circuit and a second timing signal formed by delaying the phase of the external synchronizing signal by a prescribed cycle. The detection circuit detects 1 or 0 from the recorded signal in synchronization with the first timing signal generated by the timing signal generation circuit and outputs a first detection signal corresponding to 1 and a second detection signal corresponding to 0. The signal conversion circuit converts each of first to n−1-th 1s forming the signal of n bits to (1,0) having a unit bit length in synchronization with the second timing signal from the timing signal generation circuit when the detection circuit continuously outputs the first detection signal n times (n≧2), and converts each of first to m−1-th 0s forming the signal of m bits to (0,1) having a unit bit length in synchronization with the second timing signal from the timing signal generation circuit when the detection circuit continuously outputs the second detection signal m times (m≧2). The drive signal generation circuit generates a drive signal for driving the magnetic head in response to an output signal from the signal conversion circuit.

In the magnetooptical disk unit according to the fourth aspect, the external synchronizing signal is generated on the basis of the shape formed on the magnetooptical recording medium, and the detection circuit detects "1" or "0" from the recorded signal in synchronization with the first timing signal synchronous with the external synchronizing signal and outputs the first detection signal for "1" and the second detection signal for "0". The signal conversion circuit converts each of the first to n−1-th 1s forming the signal of n bits to (1,0) having the unit bit length in synchronization with the second timing signal formed by delaying the phase of the external synchronizing signal by the prescribed cycle when the detection circuit continuously outputs the first detection signal n times (n≧2), and converts each of the first to m−1-th 0s forming the signal of m bits to (0,1) having the unit bit length in synchronization with the second timing signal formed by delaying the phase of the external synchronizing signal by the prescribed cycle when the detection circuit continuously outputs the second detection signal m times (m≧2), so that the converted recorded signal is recorded in the magnetooptical recording medium by the magnetic field modulation system.

Therefore, the magnetooptical disk unit according to the fourth aspect of the present invention detects "1" or "0" from the recorded signal and converts the signal in the signal conversion circuit on the basis of the external synchronizing signal, whereby the signal can be correctly converted and domains expressing "1" and "0" respectively can be alternately correctly formed by domains having a domain length shorter than the unit bit length by the magnetic modulation system. Consequently, a reproduced signal having peaks in a number corresponding to the domain length is detected in signal reproduction, so that the signal can be correctly reproduced under constant reproducing conditions regardless of the domain length.

According to a fifth aspect of the present invention, a magnetooptical disk unit recording a recorded signal having a signal of n bits consisting of 1s and a signal of m bits consisting of 0s arranged in a prescribed system in a magnetooptical recording medium includes an optical pickup, a magnetic head, an external synchronizing signal generation circuit, a timing signal generation circuit, a detection circuit, a signal conversion circuit and a drive signal generation circuit. The optical pickup irradiates the magnetooptical recording medium with a pulse beam. The magnetic head applies a magnetic field to the magnetooptical recording medium. The external synchronizing signal generation circuit generates an external synchronizing signal on the basis of a shape formed on the magnetooptical recording medium. The timing signal generation circuit generates a first timing signal synchronous with the external synchronizing signal generated by the external synchronizing signal generation circuit and a second timing signal formed by delaying the phase of the external synchronizing signal by a prescribed cycle. The detection circuit detects 1 or 0 from the recorded signal in synchronization with the first timing signal generated by the timing signal generation circuit and outputs a first detection signal corresponding to 1 and a second detection signal corresponding to 0. The signal conversion circuit converts each of first to n−1-th 1s forming the signal of n bits to (1,0) having a unit bit length in synchronization with the second timing signal from the timing signal generation circuit when the detection circuit continuously outputs the first detection signal n times (n≧2), and converts each of first to m−1-th 0s forming the signal of m bits to (0,1) having a unit bit length in synchronization with the second timing signal from the timing signal generation circuit when the detection circuit continuously outputs the second detection signal m times (m≧2). The drive signal generation circuit generates a drive signal for driving the magnetic head in response to an output signal from the signal conversion circuit and generates a second drive signal for emitting the pulse beam from the optical pickup.

In the magnetooptical disk unit according to the fifth aspect, the external synchronizing signal is generated on the basis of the shape formed on the magnetooptical recording medium, and the detection circuit detects "1" or "0" from the recorded signal in synchronization with the first timing signal synchronous with the external synchronizing signal and outputs the first detection signal for "1" and the second detection signal for "0". The signal conversion circuit converts each of the first to n−1-th 1s forming the signal of n bits to (1,0) having the unit bit length in synchronization with the second timing signal formed by delaying the phase of the external synchronizing signal by the prescribed cycle when the detection circuit continuously outputs the first detection signal n times (n≧2), and converts each of the first to n−1-th 0s forming the signal of m bits to (0,1) having the unit bit length in synchronization with the second timing signal formed by delaying the phase of the external synchronizing signal by the prescribed cycle when the detection circuit continuously outputs the second detection signal m times (m≧2), so that the converted recorded signal is recorded in the magnetooptical recording medium by the magnetic field modulation system applying the pulse beam.

Therefore, the magnetooptical disk unit according to the fifth aspect of the present invention detects "1" or "0" from the recorded signal and converts the signal in the signal conversion circuit on the basis of the external synchronizing signal, whereby the signal can be correctly converted and an area heated in excess of a prescribed temperature due to irradiation with the pulse beam can be reduced. Thus, domains expressing "1" and "0" respectively can be alternately correctly formed by domains having a domain length shorter than the unit bit length by the magnetic modulation system. Consequently, a reproduced signal having peaks in a number corresponding to the domain length is detected in signal reproduction so that the signal can be correctly reproduced under constant reproducing conditions regardless of the domain length.

According to a sixth aspect of the present invention, a magnetooptical disk unit reproducing a signal from a magnetooptical recording medium recording a recorded signal having a signal of n bits consisting of 1s and a signal of m bits consisting of 0s arranged in a prescribed system by converting each of first to n−1-th 1s forming the signal of n bits to (1,0) having a unit bit length when n is at least 2 and converting each of first to m−1-th 0s forming the signal of m bits to (0,1) having a unit bit length when m is at least 2 includes a magnetic head applying an alternating magnetic field at least including a magnetic field component along the in-plane direction of the magnetooptical recording medium to the magnetic recording medium and a drive signal generation circuit generating a drive signal for applying the alternating magnetic field around a boundary between domains formed on the magnetooptical recording medium on the basis of the recorded signal.

In the magnetooptical disk unit according to the sixth aspect, the magnetic head applies the alternating magnetic field including at least the magnetic field component along the in-plane direction of the magnetooptical recording medium around the boundary between the domains formed on the magnetooptical recording medium for detecting a reproduced signal having peaks in a number corresponding to the domain length such as a reproduced signal having two peaks with respect to a domain length 2T, for example.

According to the sixth aspect of the present invention, therefore, domains having various domain lengths can be correctly detected.

According to a seventh aspect of the present invention, a magnetooptical disk unit reproducing a signal from a magnetooptical recording medium recording a recorded signal having a signal of n bits consisting of 1s and a signal of m bits consisting of 0s arranged in a prescribed system by converting each of first to n−1-th 1s forming the signal of n bits to (1,0) having a unit bit length when n is at least 2 and converting each of first to m−1-th 0s forming the signal of m bits to (0,1) having a unit bit length when m is at least 2 includes a magnetic head, an external synchronizing signal generation circuit, a drive signal generation circuit and a control circuit. The magnetic head applies an alternating magnetic field at least including a magnetic field component along the in-plane direction of the magnetooptical recording medium to the magnetooptical recording medium. The external synchronizing signal generation circuit generates an external synchronizing signal on the basis of a shape formed on the magnetooptical recording medium. The drive signal generation circuit generates n drive signals for forming the alternating magnetic field varied in phase difference with respect to the external synchronizing signal on the basis of the external synchronizing signal from the external synchronizing signal generation circuit. The control circuit decides from a reproduced signal reproduced by the magnetic head by applying the alternating magnetic field to the magnetooptical recording medium on the basis of the n drive signals from the drive signal generation circuit an optimum drive signal for generating the alternating magnetic field minimizing an error rate of the reproduced signal.

The magnetooptical disk unit according to the seventh aspect decides the drive signal for applying the alternating magnetic field around a boundary between domains formed on the magnetooptical recording medium on the basis of the external synchronizing signal for minimizing the error rate of the reproduced signal.

Therefore, the magnetooptical disk unit according to the seventh aspect can reliably detect a reproduced signal having peaks in a number corresponding to the domain length and can correctly detect domains having various domain lengths.

According to an eighth aspect of the present invention, a signal recording method of recording a recorded signal having a signal of n bits consisting of 1s and a signal of m bits consisting of 0s arranged in a prescribed system in a magnetooptical recording medium includes a step of converting each of first to n−1-th 1s forming the signal of n bits to (1,0) having a unit bit length when n is at least 2 and converting each of first to m−1-th 0s forming the signal of m bits to (0,1) having a unit bit length when m is at least 2.

In the signal recording method according to the eighth aspect, the signal of n bits consisting of 1s is recorded as 2×(n−1)+1 =2n−1 (n≧2) domains having alternately arranged "1"s and "0"s, and the signal of m bits consisting of 0s is recorded as 2m−1 (m≧2) domains having alternately arranged "0"s and "1"s. A signal of "1" or "0" corresponding to the minimum domain length 1s recorded as general.

Therefore, the signal recording method according to the eighth aspect detects a reproduced signal having peaks in a number corresponding to the domain length in signal reproduction and can correctly detect domains having various domain lengths.

According to a ninth aspect of the present invention, a signal recording method of recording a recorded signal having a signal of n bits consisting of 1s and a signal of m bits consisting of 0s arranged in a prescribed system in a magnetooptical recording medium includes a first step of converting each of first to n−1-th 1s forming the signal of n bits to (1,0) having a unit bit length when n is at least 2 and converting each of first to m−1-th 0s forming the signal of m bits to (0,1) having a unit bit length when m is at least 2 and a second step of driving a magnetic head applying a magnetic field to the magnetooptical recording medium on the basis of the recorded signal converted in the first step.

In the signal recording method according to the ninth aspect, the signal of n bits consisting of 1s is recorded as 2×(n−1)+1 =2n−1 (n≧2) domains having alternately arranged "1"s and "0"s and the signal of m bits consisting of 0s is recorded as 2m−1 (m≧2) domains having alternately arranged "0"s and "1"s by the magnetic field modulation system. A signal of "1" or "0" corresponding to the minimum domain length 1s recorded as general.

Therefore, the signal recording method according to the ninth aspect can correctly detect domains expressing "1s" and "0"s respectively by domains shorter than a domain length corresponding to the unit bit length.

According to a tenth aspect of the present invention, a signal reproducing method of reproducing a signal from a magnetooptical recording medium recording a recorded signal having a signal of n bits consisting of 1s and a signal of m bits consisting of 0s arranged in a prescribed system by converting each of first to n−1-th 1s forming the signal of n bits to (1,0) having a unit bit length when n is at least 2 and converting each of first to m−1-th 0s forming the signal of m bits to (0,1) having a unit bit length when m is at least 2 includes a first step of generating a drive signal for applying an alternating magnetic field at least including a magnetic field component along the in-plane direction of the magnetooptical recording medium around a boundary between domains formed on the magnetooptical recording medium on the basis of the recorded signal and a second step of applying the alternating magnetic field to the magnetooptical recording medium on the basis of the drive signal generated in the first step.

The signal reproducing method according to the tenth aspect generates the drive signal for applying the alternating magnetic field at least including the magnetic field component along the in-plane direction of the magnetooptical recording medium around the boundary between the domains formed on the magnetooptical recording medium on the basis of the recorded signal so that the alternating magnetic field is applied to the magnetooptical recording medium on the basis of the generated drive signal. A reproduced signal having peaks in a number corresponding to the domain length such as a reproduced signal having two peaks for a domain of 2T, for example, is detected. Therefore, the signal reproducing method according to the tenth aspect can correctly detect domains having various domain lengths.

According to an eleventh aspect of the present invention, a signal reproducing method of reproducing a signal from a magnetooptical recording medium recording a recorded signal having a signal of n bits consisting of 1s and a signal of m bits consisting of 0s arranged in a prescribed system by converting each of first to n−1-th 1s forming the signal of n bits to (1,0) having a unit bit length when n is at least 2 and converting each of first to n−1-th 0s forming the signal of m bits to (0,1) having a unit bit length when m is at least 2 includes a first step of generating an external synchronizing signal on the basis of a shape formed on the magnetooptical recording medium, a second step of generating n drive signals for applying an alternating magnetic field at least including a magnetic field component along the in-plane direction of the magnetooptical recording medium by varying the phase of the external synchronizing signal generated in the first step and a third step of deciding an optimum drive signal from a reproduced signal reproduced by the magnetic head by applying the alternating magnetic field to the magnetooptical recording medium on the basis of the n drive signals generated in the second step for generating the alternating magnetic field minimizing an error rate of the reproduced signal, for applying the alternating magnetic field to the magnetooptical recording medium on the basis of the optimum drive signal decided in the third step thereby reproducing the signal.

The signal reproducing method according to the eleventh aspect decides the optimum drive signal for applying the alternating magnetic field including the magnetic field component along the in-plane direction of the magnetooptical recording medium around a boundary between domains formed on the magnetooptical recording medium for minimizing the error rate of the reproduced signal, for applying the alternating magnetic field to the magnetooptical recording medium on the basis of the decided optimum drive signal and reproducing a reproduced signal having peaks in a number corresponding to the domain length. Therefore, the signal reproducing method according to the eleventh aspect can detect a reproduced signal having peaks in a number corresponding to the domain length from domains having various domain lengths.

According to a twelfth aspect of the present invention, a magnetooptical disk unit reproducing a signal from a magnetooptical recording medium recording a recorded signal having a signal of n bits consisting of 1s and a signal of m bits consisting of 0s arranged in a prescribed system by converting each of first to n−1-th 1s forming the signal of n bits to (1,0) having a unit bit length when n is at least 2 and converting each of first to m−1-th 0s forming the signal of m bits to (0,1) having a unit bit length when m is at least 2 includes a magnetic head applying an alternating magnetic field having a prescribed angle θ with respect to the normal direction of the magnetooptical recording medium to the magnetooptical recording medium, a drive signal generation circuit generating a drive signal for applying the alternating magnetic field around a boundary between domains formed on the magnetooptical recording medium on the basis of the recorded signal and a magnetic head moving mechanism moving the magnetic head to the track direction of the magnetooptical recording medium so that the angle θ of the alternating magnetic field with respect to the normal direction of the magnetooptical recording medium is in the range of 32 to 46°.

The magnetooptical disk unit according to the twelfth aspect applies the alternating magnetic field having the angle in the range of 32 to 46° with respect to the normal direction of the magnetooptical recording medium to the magnetooptical recording medium so that magnetic domains are extensionally transferred to a reproducing layer from ends of domains formed on a recording layer of the magnetooptical recording medium for reproducing the signal. Therefore, the magnetooptical disk unit according to the twelfth aspect can reduce an error rate of the reproduced signal to not more than $10^{-4}$.

According to a thirteenth aspect of the present invention, the angle θ of the alternating magnetic field with respect to the normal direction of the magnetooptical recording medium is in the range of 37 to 43° in the magnetooptical disk unit according to the twelfth aspect.

The magnetooptical disk unit according to the thirteenth aspect applies the alternating magnetic field having the angle in the range of 37 to 43° with respect to the normal direction of the magnetooptical recording medium to the magnetooptical recording medium so that magnetic domains are extensionally transferred to the reproducing layer from ends of domains formed on the recording layer of the magnetooptical recording medium for reproducing the signal. Therefore, the magnetooptical disk unit according to the thirteenth aspect can reduce the error rate of the reproduced signal to not more than $10^{-5}$.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1A illustrates a recorded signal, FIG. 1B illustrates the recorded signal converted according to the present invention, FIG. 1C illustrates the arrangement of magnetic domains formed when recording the recorded signal shown in FIG. 1B on a recording layer of a magnetooptical recording medium, and FIG. 1D illustrates leakage magnetic fields of the magnetic domains formed on the recording layer;

FIG. 2C is a timing chart showing a drive signal for the alternating magnetic field, a reproduced signal and an external synchronizing signal in signal reproduction.

DESCRIPTION OF THE PREFERRED EMBODIMENTS

Figure 2A:
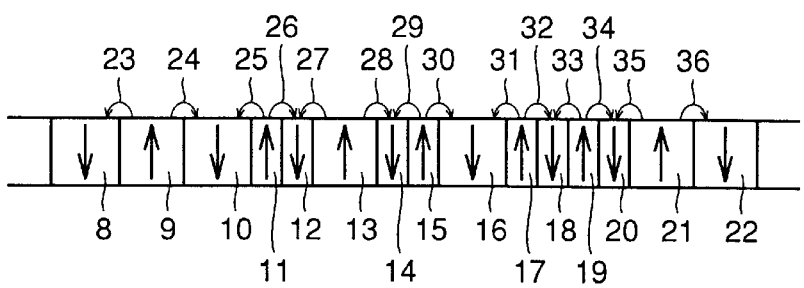
FIG. 2A illustrates the arrangement of the magnetic domains formed when recording the recorded signal shown in FIG. 1B in the recording layer and leakage magnetic fields from the magnetic domains.
Figure 2B:
FIG. 2B illustrates an alternating magnetic field applied to the magnetooptical recording medium.
Figure 2D:
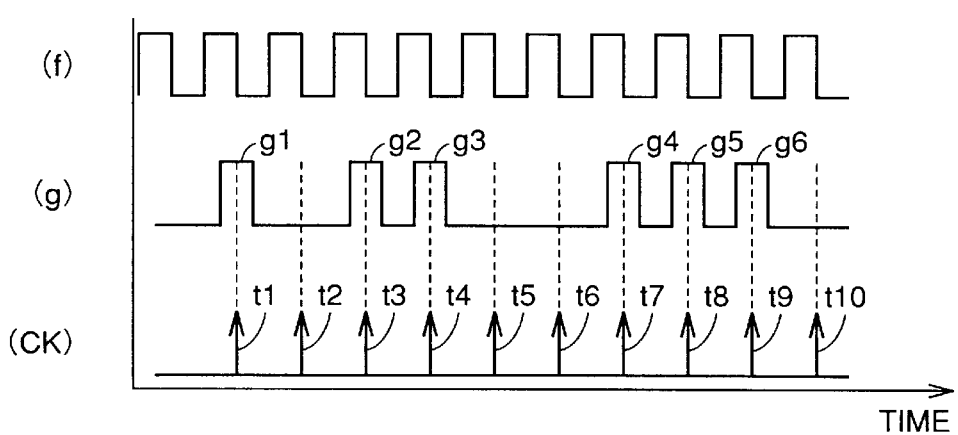
FIG. 2D illustrates the reproduced signal.

An embodiment of the present invention is described with reference to the drawings. Referring to FIGS. 1A to 1D, a recorded signal (a) consisting of "01011001110" is recorded in a magnetooptical recording medium by converting (1,1) 1 corresponding to a domain of 2T to (1,0,1) and converting (0,0) 2 to (0,1,0). In other words, the first "1" of(1,1) 1 is converted to unit bits "1,0" 4 and the first "0" of (0,0) 2 is converted to unit bits "0,1" 5. Similarly, the first "1" of(1,1,1) 3 corresponding to a domain of 3T is converted to unit bits "1,0" 6 and the second "1" is converted to unit bits "1,0" 7. The unit bit "1" or "0" is not converted but recorded as such. According to the present invention, therefore, the recorded signal (a) is converted to a recorded signal (b) for modulating a magnetic field applied to the magnetooptical recording medium on the basis of the recorded signal (b) and recording the signal.

According to the present invention, a recorded signal having a signal of n bits consisting of 1s and a signal of m bits consisting of 0s arranged in a prescribed system is converted by converting each of first to n–1-th "1"s forming the signal of n bits to "1,0" having unit bits when n≧2 and converting each of first to n–1-th "0"s forming the signal of m bits to "0,1" when m≧2.

In the converted recorded signal (b), the first three bits "0", "1" and "0" are unit bits respectively and hence recorded as domains 8, 9 and 10 as such. (1,0,1) of the recorded signal (b) corresponding to the 2-bit signal (1,1) 1 of the recorded signal (a) are recorded as domains 11, 12 and 13, (0,1,0) of the recorded signal (b) corresponding to the 2-bit signal (0,0) 2 of the recorded signal (a) are recorded as domains 14, 15 and 16, (1,0,1,0,1) of the recorded signal (b) corresponding to the 3-bit signal (1,1,1) 3 of the recorded signal (a) are recorded as domains 17, 18, 19, 20 and 21, and the last unit bit signal "0" of the recorded signal (a) is recorded as a domain 22 as such (see FIG. 1C).

A leakage magnetic field 23 directed from the domain 9 to the domain 8 is present on the boundary between the domains 8 and 9, and a leakage magnetic field 24 directed from the domain 9 to the domain 10 is present on the boundary between the domains 9 and 10.

A leakage magnetic field 25 directed from the domain 1 to the domain 10 is present on the boundary between the domains 10 and 11, and a leakage magnetic field 26 directed from the domain 11 to the domain 12 is present on the boundary between the domains 11 and 12.

A leakage magnetic field 27 directed from the domain 13 to the domain 12 is present on the boundary between the domains 12 and 13, and a leakage magnetic field 28 directed from the domain 13 to the domain 14 is present on the boundary between the domains 13 and 14.

A leakage magnetic field 29 directed from the domain 15 to the domain 14 is present on the boundary between the domains 14 and 15, and a leakage magnetic field 30 directed from the domain 15 to the domain 16 is present on the boundary between the domains 15 and 16.

A leakage magnetic field 31 directed from the domain 17 to the domain 16 is present on the boundary between the domains 16 and 17, and a leakage magnetic field 32 directed from the domain 17 to the domain 18 is present on the boundary between the domains 17 and 18.

A leakage magnetic field 33 directed from the domain 19 to the domain 18 is present on the boundary between the domains 18 and 19, and a leakage magnetic field 34 directed from the domain 19 to the domain 20 is present on the boundary between the domains 19 and 20.

A leakage magnetic field 35 directed from the domain 21 to the domain 20 is present on the boundary between the domains 20 and 21, and a leakage magnetic field 36 directed from the domain 21 to the domain 22 is present on the boundary between the domains 21 and 22 (see FIG. 1D).

Figure 3A:
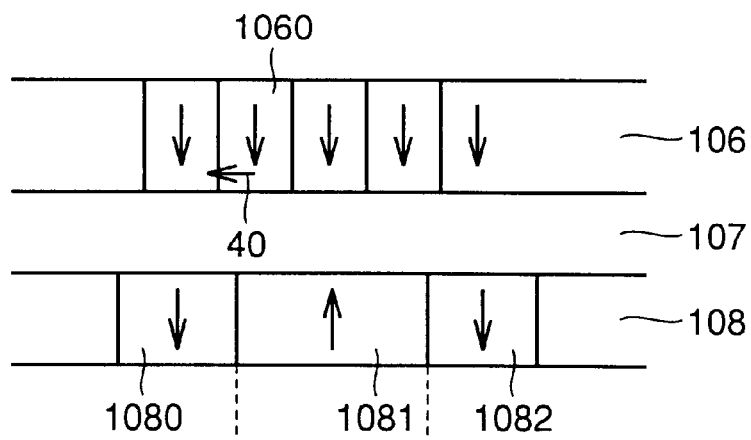
FIG. 3A illustrates magnetized states of magnetic domains in a reproducing layer and the recording layer of the magnetooptical recording medium.
Figure 3B:
FIG. 3B is an intensity distribution diagram of a leakage magnetic field of a domain formed on the recording layer perpendicular to the film surface.
Figure 3C:
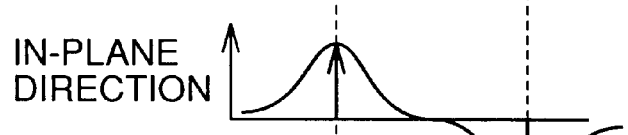
FIG. 3C is an intensity distribution diagram of an in-plane leakage magnetic field of the magnetic domain formed on the recording layer.

Referring to FIGS. 2A to 2D, an alternating magnetic field (e) is applied to the magnetooptical recording medium when applying an alternating magnetic field Hex having a prescribed angle with respect to the normal direction of the magnetooptical recording medium on the basis of a drive signal (f) while recording the recorded signal (b) shown in FIG. 1B as the domains 8, 9, 10, 11, 12, 13, 14, 15, 16, 17, 18, 19,20, 21 and 22. In magnetic fields Hex1 and Hex2 forming the alternating magnetic field Hex, the magnetic field Hex1 is applied to the boundary between the domains 8 and 9, the boundary between the domains 9 and 10, the boundary between the domains 10 and 11, the boundary between the domains 12 and 13, the boundary between the domains 13 and 14, the boundary between the domains 15 and 16, the boundary between the domains 16 and 17, the boundary between the domains 18 and 19, the boundary between the domains 20 and 21 and the boundary between the domains 21 and 22. Assuming that magnetic domains are extensionally transferred from a recording layer to a reproducing layer at the timing of application of the magnetic field Hex1 and the magnetic domains extensionally transferred to the reproducing layer are erased at the timing of application of the magnetic field Hex2 as to the magnetic fields Hex1 and Hex2 forming the alternating magnetic field Hex, the domains 9, 11, 13, 17, 19 and 21 are extensionally transferred to the reproducing layer at the timing of application of the magnetic field Hex 1 forming the alternating magnetic field Hex to the boundary between the domains 8 and 9, the boundary between the domains 9 an 10, the boundary between the domains 10 and 11, the boundary between the domains 12 and 13, the boundary between the domains 13 and 14, the boundary between the domains 15 and 16, the boundary between the domains 16 and 17, the boundary between the domains 18 and 19, the boundary between the domains 20 and 21 and the boundary between the domains 21 and 22. This is because the magnetic field Hex1 includes a component of the same direction as the leakage magnetic fields 23, 25, 27, 31, 33 and 35. In other words, an in-plane magnetic field is applied to the domains 9, 11, 13, 17, 19 and 21 for prompting transfer to the reproducing layer. The principle of prompting transfer to the reproducing layer by applying the in-plane magnetic field is described with reference to FIGS. 3A to 3D. As shown in FIG. 3A, a magnetic layer is formed by a reproducing layer 106, a nonmagnetic layer 107 and a recording layer 108, and the reproducing layer 106 is initialized in a constant direction. The recording layer 108, recording a signal, is provided with domains 1080, 1081 and 1082. FIG. 3B shows intensity distribution of a perpendicular leakage magnetic field of the domain 1081 directed to the reproducing layer 106. FIG. 3C shows intensity distribution of an in-plane leakage magnetic field of the domain 1081. Assuming that the domain 1081 has oppositely directed leakage magnetic fields of the same intensity on both ends and the leakage magnetic field on the boundary between the domains 1080 and 1081 is directed from the domain 1081 to the domain 1080, the leakage magnetic field on the boundary between the domains 1081 and 1082 is directed from the domain 1081 to the domain 1082. Therefore, the in-plane leakage magnetic fields from the domain 1081 acting on the reproducing layer 106 have the same intensity, to result in the same magnetic field intensity acting to reverse magnetization of the reproducing layer 106 to the direction of magnetization of the domain 1081. Consequently, no preferential transfer to the reproducing layer 106 is caused from an end of the domain 1081.

Figure 3D:
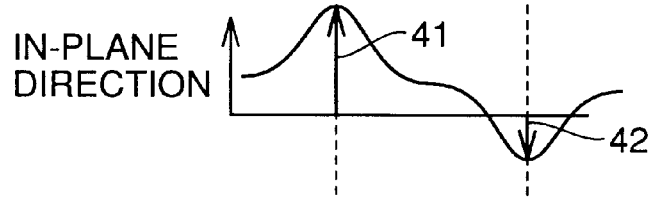
FIG. 3D is an intensity distribution diagram of the in-plane leakage magnetic field of the magnetic domain formed on the recording layer upon external application of a magnetic field parallel to the film surface.

When the magnetic field including the in-plane magnetic field component is applied to the domain 1081, the intensity of the in-plane leakage magnetic field from the domain 1081 is distributed as shown in FIG. 3D. When a magnetic field directed from the domain 1081 to the domain 1080 is applied, a leakage magnetic field 41 on the boundary between the domains 1080 and 1081 is stronger than a leakage magnetic field 42 on another boundary. Therefore, a leakage magnetic field 40 acts on a magnetic domain 1060 of the reproducing layer 106 corresponding to an end of the domain 1081 closer to the domain 1080 so that magnetization of the magnetic domain 1060 is readily reversed to the same direction as magnetization of the domain 1081. Consequently, transfer of the domain 1081 to the reproducing layer 106 is caused from the end closer to the domain 1080, a seed magnetic domain having magnetization of the same direction as the magnetization of the domain 1081 is caused on the magnetic domain 1060 of the reproducing layer 106, and the seed magnetic domain is extended due to application of the magnetic field perpendicular to the reproducing layer 106 in the same direction as the magnetization of the domain 1081.

Thus, when a magnetic field including an in-plane magnetic field component is applied, transfer to the reproducing layer is prompted.

Referring again to FIGS. 2A to 2D, a reproduced signal (g) reproduced with application of the alternating magnetic field (e) is detected in synchronization with an external synchronizing signal (CK). The reproduced signal (g) is high (at a high logical level) and hence "1" is detected at a timing t1, the reproduced signal (g) is low (at a low logical level) and hence "0" is detected at a timing t2, the reproduced signal (g) is high and hence "1" is detected at a timing t3, the reproduced signal (g) is high and hence "1" is detected at a timing t4, the reproduced signal (g) is low and hence "0" is detected at a timing t5, the reproduced signal (g) is low and hence "0" is detected at a timing t6, the reproduced signal (g) is high and hence "1" is detected at a timing t7, the reproduced signal (g) is high and hence "1" is detected at a timing t8; the reproduced signal (g) is high and hence "1" is detected at a timing t9, and the reproduced signal (g) is low and hence "0" is detected at a timing t10. Consequently detected is a signal (h) shown in FIG. 2D, which is identical to the recorded signal (a) shown in FIG. 1A.

In this case, the domain 9 is detected as a component g1, the domains 11, 12 and 13 are detected as components g2 and g3, and the domains 17, 18, 19, 20 and 21 are detected as components g4, g5 and g6. As clearly understood from FIGS. 1A to 1D, the domain 9 records the unit-bit signal "1", the domains 11, 12 an 13 record the 2-bit signal "1,1" and the domains 17, 18, 19, 20 and 21 record the 3-bit signal "1,1,1" respectively. Therefore, a peak is detected from the domain recording the unit-bit signal, two peaks are detected from the domains recording the 2-bit signal, and three peaks are detected from the domains recording the 3-bit signal.

When the recorded signal (a) shown in FIG. 1A is converted to and recorded as the recorded signal (b) shown in FIG. 1B and the alternating magnetic field including the in-plane magnetic field component is applied to the magnetic layer for reproducing the signal, a reproduced signal having peaks in a number corresponding to the domain length 1s detected.

When recording a signal by the aforementioned recording method according to the present invention, it follows that domains below the minimum domain length are present in the recording layer, not to cause such a problem that the degree of transfer from the recording layer to the reproducing layer varies with the domain length dissimilarly to the conventional recording method.

Figure 4:
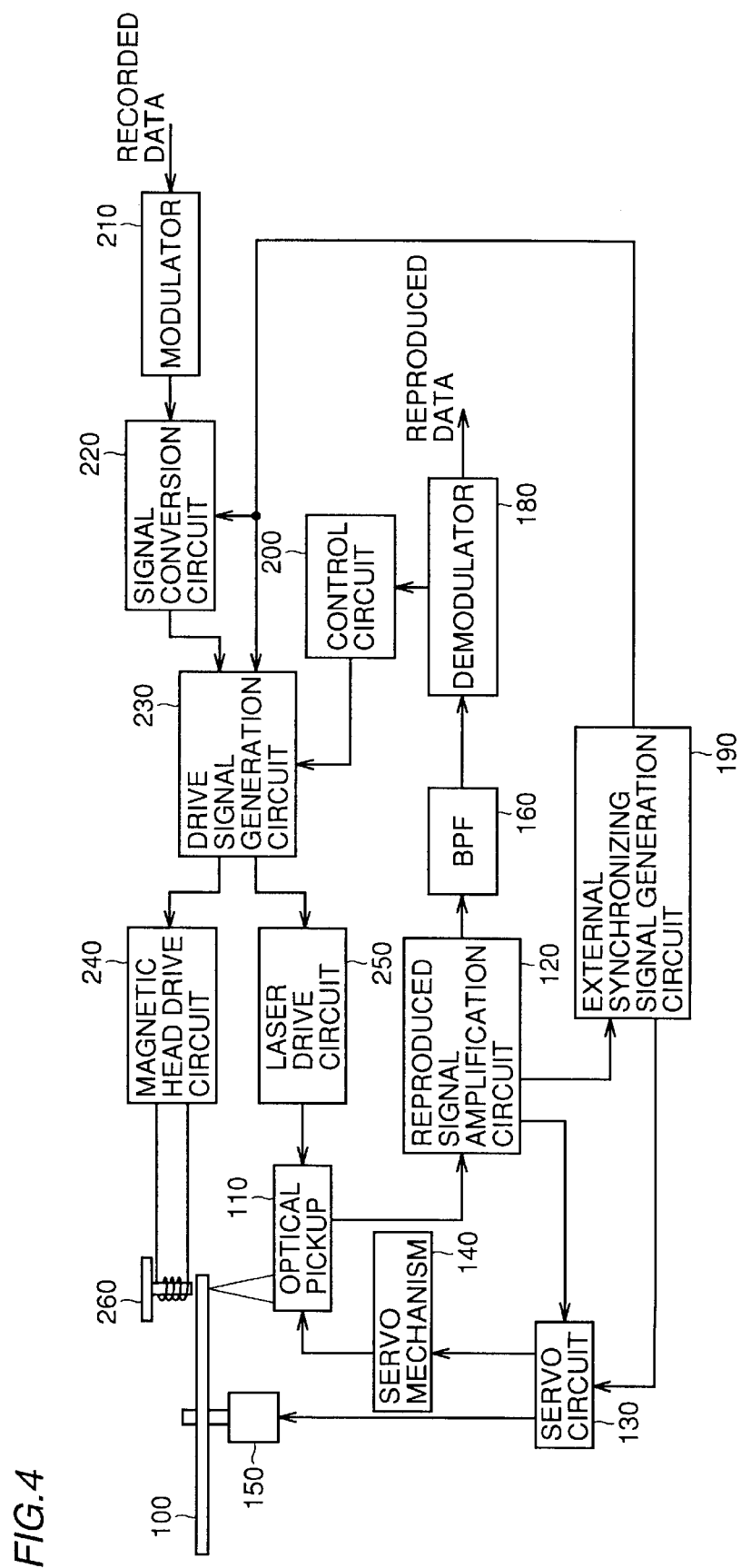
FIG. 4 is a block diagram of a magnetooptical disk unit according to the present invention.

Referring to FIG. 4, a magnetooptical disk unit according to the present invention comprises an optical pickup 110, a reproduced signal amplification circuit 120, a servo circuit 130, a servo mechanism 140, a spindle motor 150, a BPF 160, a demodulator 180, an external synchronizing signal generation circuit 190, a control circuit 200, a modulator 210, a signal conversion circuit 220, a drive signal generation circuit 230, a magnetic head drive circuit 240, a laser drive circuit 250 and a magnetic head 260.

The optical pickup 110 irradiates a magnetooptical recording medium 100 with a continuous laser beam or a pulsed laser beam (hereinafter referred to also as a "pulse beam") and detects a reflected beam.

The reproduced signal amplification circuit 120 amplifies a focus error signal and a tracking error signal detected by the optical pickup 110, a magnetooptical signal and an optical signal resulting from a shape serving as a reference for generating an external synchronizing signal to prescribed levels and outputs the focus error signal and the tracking error signal to the servo circuit 130 while outputting the magnetooptical signal to the BPF 160 and outputting the optical signal to the external synchronizing signal generation circuit 190.

The external synchronizing signal generation circuit 190 generates an external synchronizing signal (CK) on the basis of the input optical signal by a method described later and outputs the same to the servo circuit 130, the signal conversion circuit 220 and the drive signal generation circuit 230.

The servo circuit 130 controls the servo mechanism 140 to perform focus servo control and tracking servo control on an objective lens (not shown) of the optical pickup 110 on the basis of the input focus error signal and tracking error signal while rotating the spindle motor 150 at a prescribed rotational frequency on the basis of the input external synchronizing signal.

The servo mechanism 140 performs focus servo control and tracking servo control on the objective lens in the optical pickup 110 under control of the servo circuit 130.

The spindle motor 150 rotates the magnetooptical recording medium 100 at a prescribed rotational frequency.

The BPF 160 eliminates a high-frequency region exceeding a prescribed level and a low-frequency region below a prescribed level from the input magnetooptical signal.

The demodulator 180 demodulates the magnetooptical signal and outputs the demodulated magnetooptical signal as reproduced data while outputting the same to the control circuit 200.

The control circuit 200 detects the minimum value of an error rate from the input reproduced signal and outputs the result to the drive signal generation circuit 230 while controlling the respective parts of the magnetooptical disk unit.

The modulator 210 modulates recorded data to a prescribed system.

The signal conversion circuit 220 converts the recorded signal on the basis of the external synchronizing signal (CK) by a method described later.

The drive signal generation circuit 230 generates a drive signal driving the magnetic head 260 and a drive signal driving a semiconductor laser (not shown) in the optical pickup 110 on the basis of the external synchronizing signal (CK) by a method described later.

The magnetic head drive circuit 240 drives the magnetic head 260 on he basis of the drive signal from the drive signal generation circuit 230.

The laser drive circuit 250 drives the semiconductor laser in the optical pickup 110 on the bass of the live signal from the drive signal generation circuit 230.

The magnetic head 260 applies a magnetic field to the magnetooptical recording medium 100.

Figures 5A, 5B:
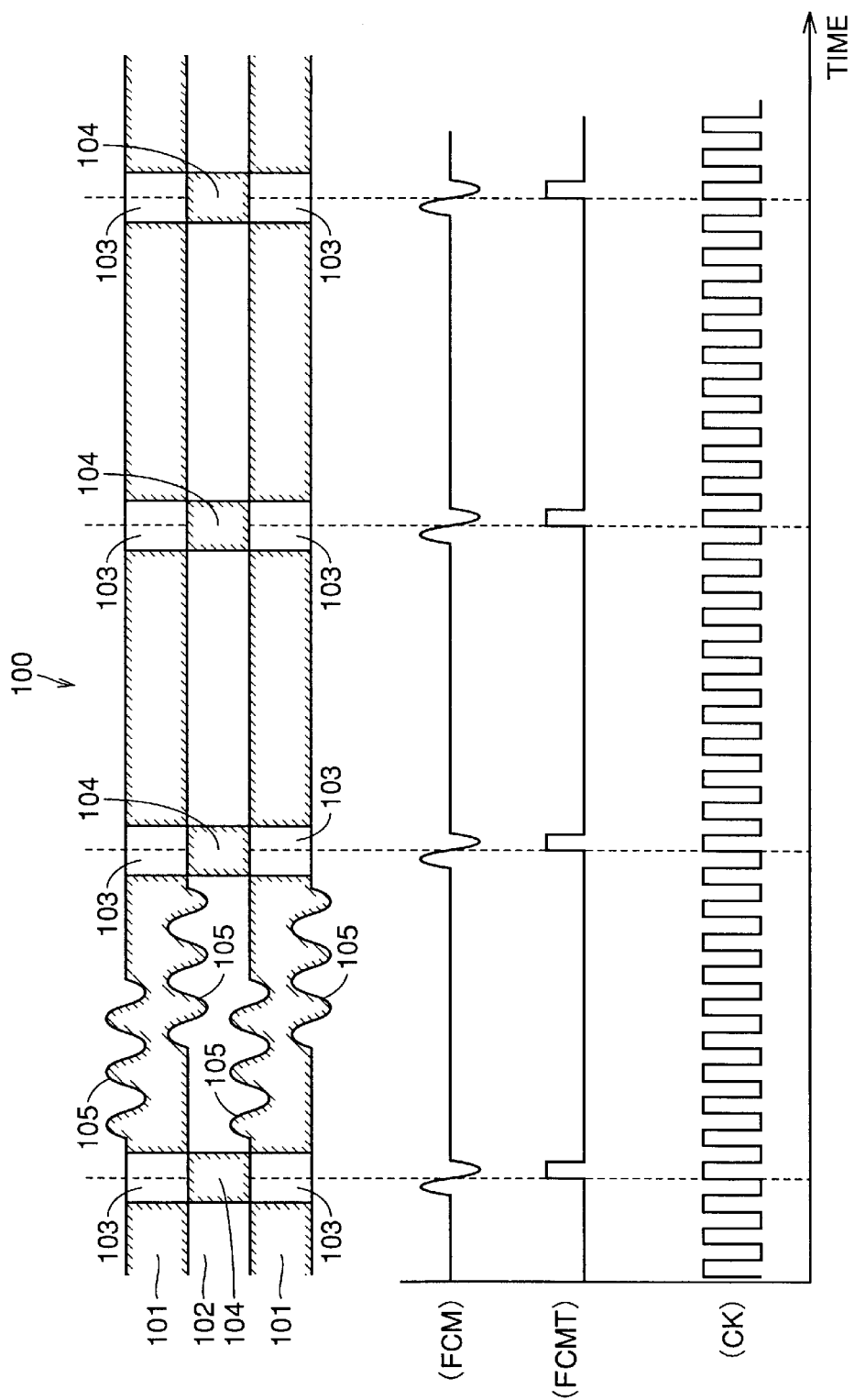
FIG. 5A is a plan view of the magnetooptical recording medium.
FIG. 5B is a timing chart for illustrating generation of an external synchronizing signal.

The method of generating the external synchronizing signal (CK) in the external synchronizing signal generation circuit 190 is described with reference to FIGS. 5A and 5B. In the magnetooptical recording medium 100, grooves 101 and lands 102 are alternately arranged along the radial direction. Each groove 101 has a plane structure including lands 103 at regular intervals, and each land 102 has a plane structure including grooves 104 at regular intervals. Wobbles 105 recording address information are formed between each pair of adjacent lands 103 of the groove 101. Consequently, wobbles 105 recording address information also exist between each pair of adjacent grooves 104 of the land 102. When the laser beam travels along the groove 101 or the land 102, the cyclically formed lands 103 or grooves 104 are detected as a fine clock mark signal (FCM) by detecting a reflected beam of the applied laser beam by a radial push/pull method. A pulse signal (FCMT) synchronized with the centers of the lands 103 or the grooves 104 is generated on the basis of the detected fine clock mark signal (FCM), for generating the external synchronizing signal (CK) so that a prescribed number of cyclic signals are present between respective pulse components of the generated pulse signal (FCMT).

In the magnetooptical recording medium 100 according to the extensional magnetic domain reproducing system, the width of the groove 101 and the land 102 is 0.3 to 0.6 $\mu$m, and the lands 103 and the grooves 104, having a length of 1.0 $\mu$m along the track direction, are formed at intervals of 20 to 140 $\mu$m. The frequency of the generated external synchronizing signal (CK) is 40 MHz.

Figure 6:
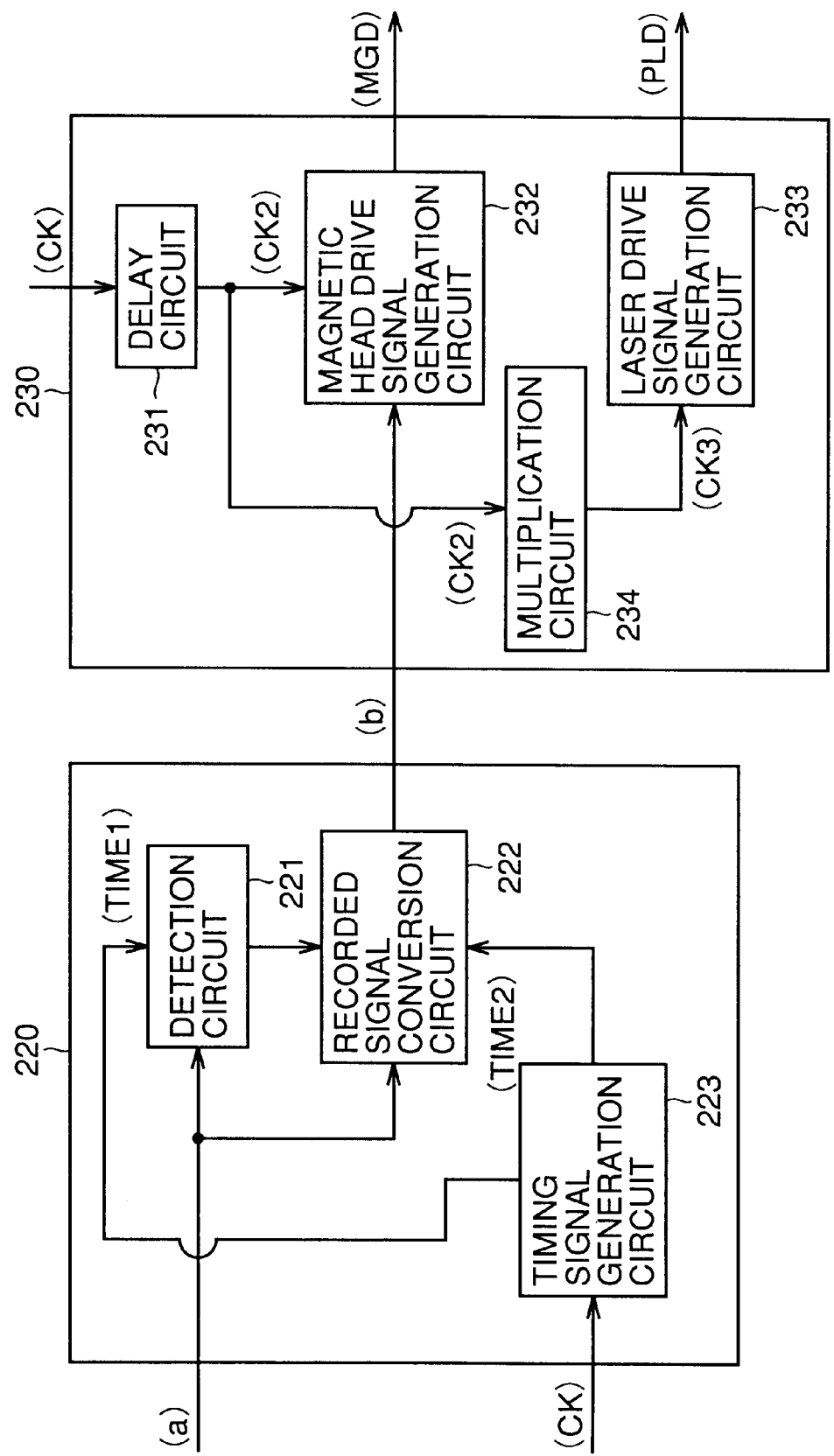
FIG. 6 is a diagram for illustrating a signal conversion circuit and a drive signal generation circuit of the magnetooptical disk unit shown in FIG. 4.
Figure 7:
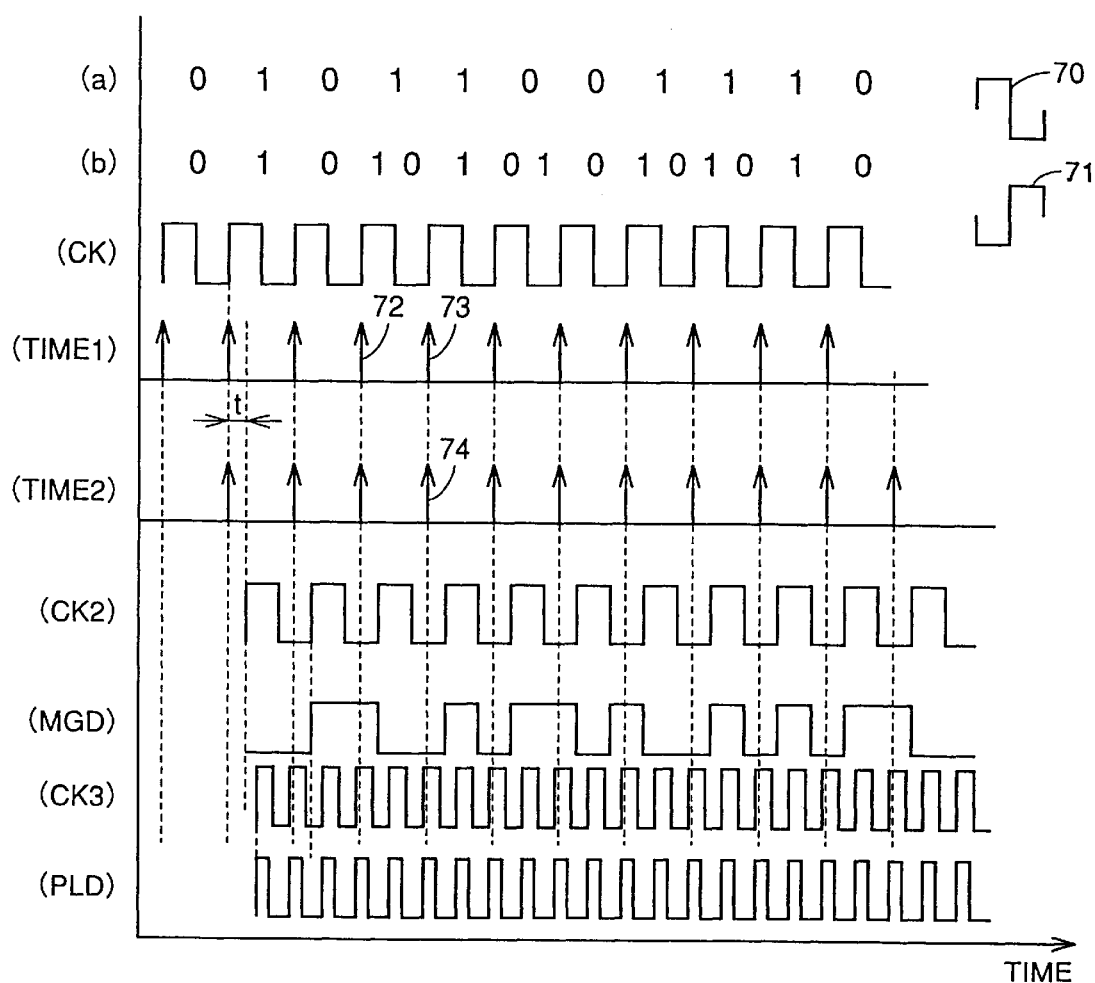
FIG. 7 illustrates signals input in/output from the signal conversion circuit and the drive signal generation circuit of the magnetooptical disk unit shown in FIG. 4.

The signal conversion circuit 220 and the drive signal generation circuit 230 are described in detail with reference to FIGS. 6 and 7. The signal conversion circuit 220 includes a detection circuit 221, a recorded signal conversion circuit 222 and a timing signal generation circuit 223. The detection circuit 221 detects "1" or "0" from the recorded signal (a) (see FIG. 7) at the timing of a timing signal TIME1 synchronous with the external synchronizing signal (CK), for outputting a first detection signal 70 to the recorded signal conversion circuit 222 when detecting "1" while Outputting a second detection signal 71 to the recorded signal conversion circuit 222 when detecting "0". The timing signal generation circuit 223 generates the timing signal TIME1 synchronous with the external synchronizing signal (CK) and a timing signal TIME2 obtained by delaying the phase of the external synchronizing signal (CR) by a constant cycle, for outputting the timing signal TIME1 to the detection circuit 211 while outputting the timing signal TIME2 to the recorded signal conversion circuit 222. The recorded signal conversion circuit 222 converts the first "1" to "1,0" having a unit bit length when the first detection signal 70 is continuously input from the detection circuit 221 in synchronization with the timing signal TIME2 from the timing signal generation circuit 223. Referring to FIG. 7, the detection circuit 221 detects "1" or "0" from the recorded signal (a) at the timing of the timing signal TIME1 synchronous with the external synchronizing signal (CK), and the recorded signal conversion circuit 222 converts the signal in synchronization with the timing signal TIME2. Therefore, the detection circuit 221 detects the first "1" of "1,1" consisting of two continuous "1"s from the recorded signal (a) at a timing 72 for outputting the first detection signal 70 to the recorded signal conversion circuit 222, and detects the next "1" at a timing 73 for outputting the first detection signal 70 to the recorded signal conversion circuit 222. The recorded signal conversion circuit 222 converts the first "1" to "1,0" having the unit bit length at a timing 74 of the timing signal TIME2 identical to the timing 73 receiving the second first detection signal 70. The recorded signal conversion circuit 222 converts "1,1,1" consisting of three continuous "1"s in a similar manner to the above. The recorded signal conversion circuit 222 converts the first "0" to "0,1" having a unit bit length when the second detection signal 71 is continuously input from the detection circuit 221 in synchronization with the timing signal TIM2 from the timing signal generation circuit 223. In this case, the recorded signal conversion circuit 222 operates identically to the above.

Referring again to FIG. 6, the drive signal generation circuit 230 includes a delay circuit 231, a magnetic head drive signal generation circuit 232, a laser drive signal generation circuit 233 and a multiplication circuit 234. The delay circuit 231 generates a synchronizing signal (CK2) for recording or reproducing the signal by delaying the phase of the input external synchronizing signal (CK) by a constant quantity t, and outputs the same to the magnetic head drive signal generation circuit 232 and the multiplication circuit 234. The magnetic head drive signal generation circuit 232 generates a drive signal (MGD) for driving the magnetic head 260 modulated on the basis of the recorded signal (b) in synchronization with the input synchronizing signal (CK2) and outputs the same to the magnetic head drive circuit 240. The multiplication circuit 234 generates a synchronizing signal (CK3) by doubling the frequency of the input synchronizing signal (CK2) and outputs the same to the laser drive signal generation circuit 233. The laser drive signal generation circuit 233 generates a drive signal (PLD) for generating the pulse beam in synchronization with the input synchronizing signal (CK3) and outputs the same to the laser drive circuit 250.

An operation of recording a signal by the magnetooptical disk unit according to the present invention is described with reference to FIG. 4 again. When the magnetooptical recording medium 100 is mounted on the magnetooptical disk unit, the spindle motor 150 rotates the magnetooptical recording medium 100 at the prescribed rotational speed under control of the control circuit 200, so that the optical pickup 110 irradiates the magnetooptical recording medium 100 with a continuous laser beam and detects the focus error signal and the tracking error signal. Focus servo control and tracking seivo control are performed on the objective lens (not shown) in the optical pickup 110 on the basis of the detected focus error signal and tracking error signal, as described above. Thereafter the optical pickup 110 detects the fine clock mark signal (FCM) resulting from the shape (the lands 103 or the grooves 104 shown in FIG. 5) forming the reference for generating the external synchronizing signal (CK) by a tangential push/pull method, and inputs the detected fine clock mark signal (FCM) in the external synchronizing signal generation circuit 190 through the reproduced signal amplification circuit 120. The external synchronizing signal generation circuit 190 generates the external synchronizing signal (CK) by the aforementioned method and outputs the external synchronizing signal (CK) to the signal conversion circuit 220 and the drive signal generation circuit 230.

The modulator 210 modulates the recorded data by a prescribed system, while the signal conversion circuit 220 converts the modulated recorded signal (a) on the basis of the external synchronizing signal (CK) by the aforementioned method and outputs the recorded signal (b) to the drive signal generation circuit 230. The drive signal generation circuit 230 generates the drive signal (MGD) for driving the magnetic head 260 synchronous with the synchronizing signal (CK) and modulated on the basis of the recorded signal (b) and the drive signal (PLD) for generating the pulse beam synchronous with the synchronizing signal (CK3) obtained by doubling the frequency of the synchronizing signal (CK) by the aforementioned method and outputs the drive signal (MGD) to the magnetic head drive circuit 240 while outputting the drive signal OLD) to the laser drive circuit 250. The magnetic head drive circuit 240 drives the magnetic head 260 on the basis of the drive signal (MGD), and the magnetic head 260 applies a magnetic field modulated by the recorded signal (b) to the magnetooptical recording medium 100. The laser drive circuit 250 pulse-drives the semiconductor laser (not shown) in the optical pickup 110 on the basis of the drive signal (PLD), and the optical pickup 110 irradiates the magnetooptical recording medium 100 with the pulse beam. Thus, the recorded signal (b) is recorded in the magnetooptical recording medium 110 by the magnetic field modulation system with application of the pulse beam.

The magnetic field applied to the magnetooptical recording medium 100 for recording the signal may be perpendicular to the magnetooptical recording medium 100 or may have a constant angle with respect to the normal direction of the magnetooptical recording medium 100. The duty ratio of the applied pulse beam is in the range of 30 to 35%.

In order to reproduce a signal from the magnetooptical recording medium 100 in the present invention, an alternating magnetic field (referred to also as "alternating magnetic field including a magnetic field component along the in-plane direction of the magnetooptical recording medium 100) along a direction having a constant angle with respect to the normal direction of the magnetooptical recording medium 100 is applied to the magnetooptical recording medium 100 for extensionally transferring magnetic domains from the recording layer to the reproducing layer by magnetostatic coupling through the nonmagnetic layer as described above. At this time, the alternating magnetic field along the direction having a constant angle with respect to the normal direction of the magnetooptical recording medium 100 must be correctly applied to the area of the magnetooptical recording medium 100 to be reproduced.

Figure 8:
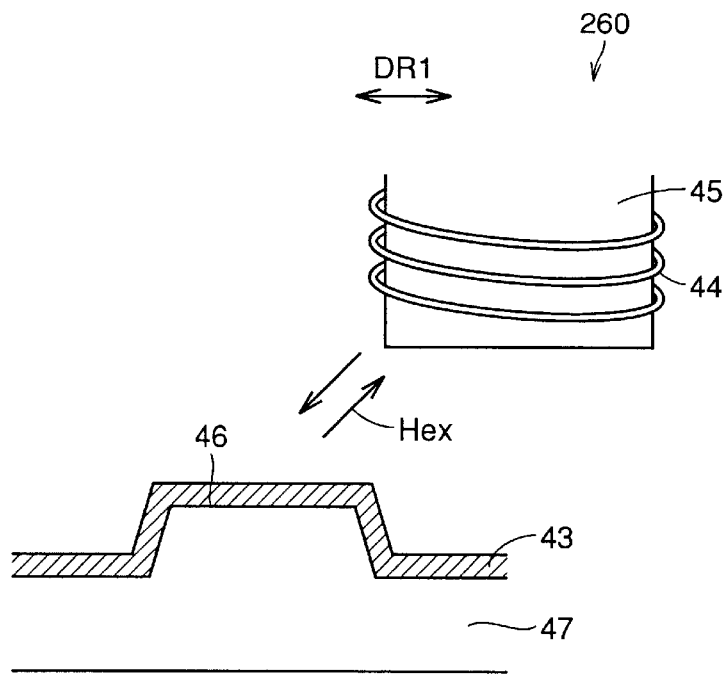
FIG. 8 illustrates a method of controlling the position of a magnetic head.

Referring to FIG. 8, the magnetic head 260 applying the alternating magnetic field Hex along the direction having a constant angle with respect to the normal direction of the magnetooptical recording medium 100 is formed by a core 45 and a coil 44 wound on the core 45, for applying the alternating magnetic field Hex to a land 46 of a magnetic layer 43 formed on a transparent substrate 47 by feeding a current having a changing direction to the coil 44. While the position of the magnetic head 260 must be controlled in order to correctly apply the alternating magnetic field Hex to the land 46, this position control is performed by moving the magnetic head 260 along the radial direction DR1 of the magnetooptical recording medium 100 so that the error rate of the reproduced signal reproduced by magnetic domain extension is minimized.

Figure 9:
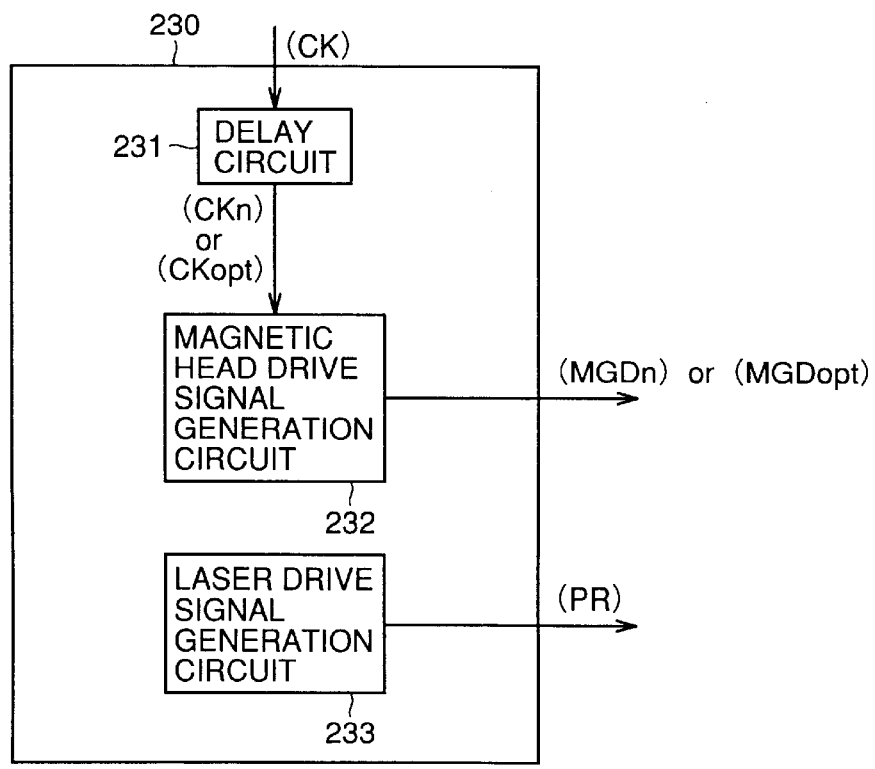
FIG. 9 illustrates operations of the drive signal generation circuit for deciding a drive signal for applying an alternating magnetic field in a direction having a constant angle with respect to the normal direction of the magnetooptical recording medium 100 to boundaries between magnetic domains.
Figure 10:
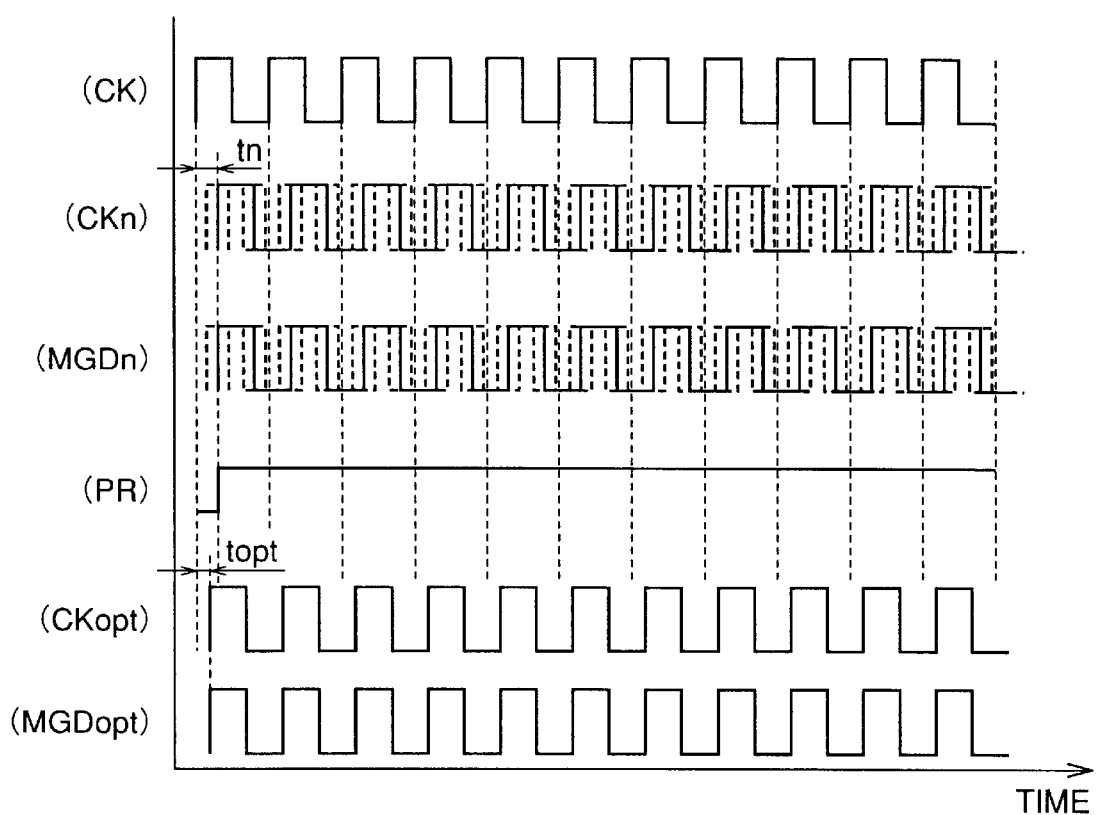
FIG. 10 illustrates signals input in and output from the drive signal generation circuit when deciding the drive signal for applying the alternating magnetic field in the direction having the constant angle with respect to the normal direction of the magnetooptical recording medium 100 to the boundaries between the magnetic domains.

As described above with reference to FIGS. 2A to 2D and 3A to 3D, the alternating magnetic field Hex must be applied to the boundaries between the magnetic domains, in order to correctly extensionally transfer the magnetic domains from the recording layer to the reproducing layer. A method of deciding an optimum drive signal for applying the alternating magnetic field Hex to the boundaries between the magnetic domains is now described with reference to FIGS. 9 and 10. When deciding the optimum drive signal, the delay circuit 231 in the drive signal generation circuit 230 generates n synchronizing signals (CKn) by converting the phase of the external synchronization signal(CK) under control of the control circuit 200 and outputs the generated n synchronizing signals (CKn) to the magnetic head drive signal generation circuit 232. The magnetic head drive signal generation circuit 232 generates n drive signals (MGDn) for driving the magnetic head 260 in synchronization with the n synchronizing signals (CKn) and outputs the same to the magnetic head drive circuit 240. The laser drive signal generation circuit 233 generates a drive signal (PR) for generating a continuous laser beam having prescribed intensity and outputs the same to the laser drive circuit 250. The magnetic head drive circuit 240 drives the magnetic head 260 on the basis of the n drive signals (MGDn), and the magnetic head 260 applies the alternating magnetic field Hex to the magnetooptical recording medium 100 at different timings on the basis of the n drive signals (MGDn). The laser drive circuit 250 drives the semiconductor laser (not shown) in the optical pickup 110 on the basis of the drive signal (PR), and the optical pickup 110 irradiates the magnetooptical recording medium 100 with the continuous laser beam. The signal is reproduced from the magnetooptical recording medium 100 by magnetic domain extension, and the reproduced magnetooptical signal is input in the control circuit 200 through the reproduced signal amplification circuit 120, the BPF 160 and the demodulator 180, as described above. The control circuit 200 detects the error rate from the input reproduced signal and detects the minimum error rate from the detected error rate. The control circuit 200 detects the phase difference with respect to the external synchronizing signal (CK) implementing the minimum error rate, and outputs the phase difference to the delay circuit 231 in the drive signal generation circuit 230. The delay circuit 231 generates a synchronizing signal (CKopt) having the phase difference input from the control circuit 200 with respect to the external synchronizing signal (CK) and outputs the same to the magnetic head drive signal generation circuit 232. The magnetic head drive signal generation circuit 232 generates an optimum drive signal (MGDopt) on the basis of the synchronizing signal (CKopt) and outputs the same to the magnetic head drive circuit 240. The magnetic head drive circuit 240 drives the magnetic head 260 on the basis of the drive signal (MGDopt), and the magnetic head 260 applies the alternating magnetic field Hex to the magnetooptical recording medium 100 on the basis of the drive signal(MGDopt). Thus, the alternating magnetic field Hex can be applied to the boundaries between the magnetic domains, for enabling correct signal reproduction.

A flow chart of a signal recording method according to the present invention is described with reference to FIG. 11. When recording is started (step S1), the external synchronizing signal (CK) is generated on the basis of the fine clock mark signal (FCM) detected with reference to the lands 103 or the grooves 104 formed on the magnetooptical recording medium 100 (step S2). In the recorded signal including the signal of n bits consisting of "1"s and the signal of m bits consisting of "0"s, each of the first to n−1-th 1s forming the signal of n bits is converted to (1,0) having the unit bit length when n is at least 2 and each of the first to m−1-th 0s forming the signal of m bits is converted to (0,1) having the unit bit length on the basis of the external synchronizing signal (step S3). Thereafter the first drive signal driving the magnetic head 260 on the basis of the recorded signal converted at the step S3 and the second drive signal for generating the pulse beam are generated (step S4), for applying the magnetic field to the magnetooptical recording medium 100 on the basis of the first drive signal generated at the step S4 and irradiating the magnetooptical recording medium 100 with the pulse beam on the basis of the second drive signal for recording the signal (step S5) and then terminating the recording (step S6).

Figure 11:
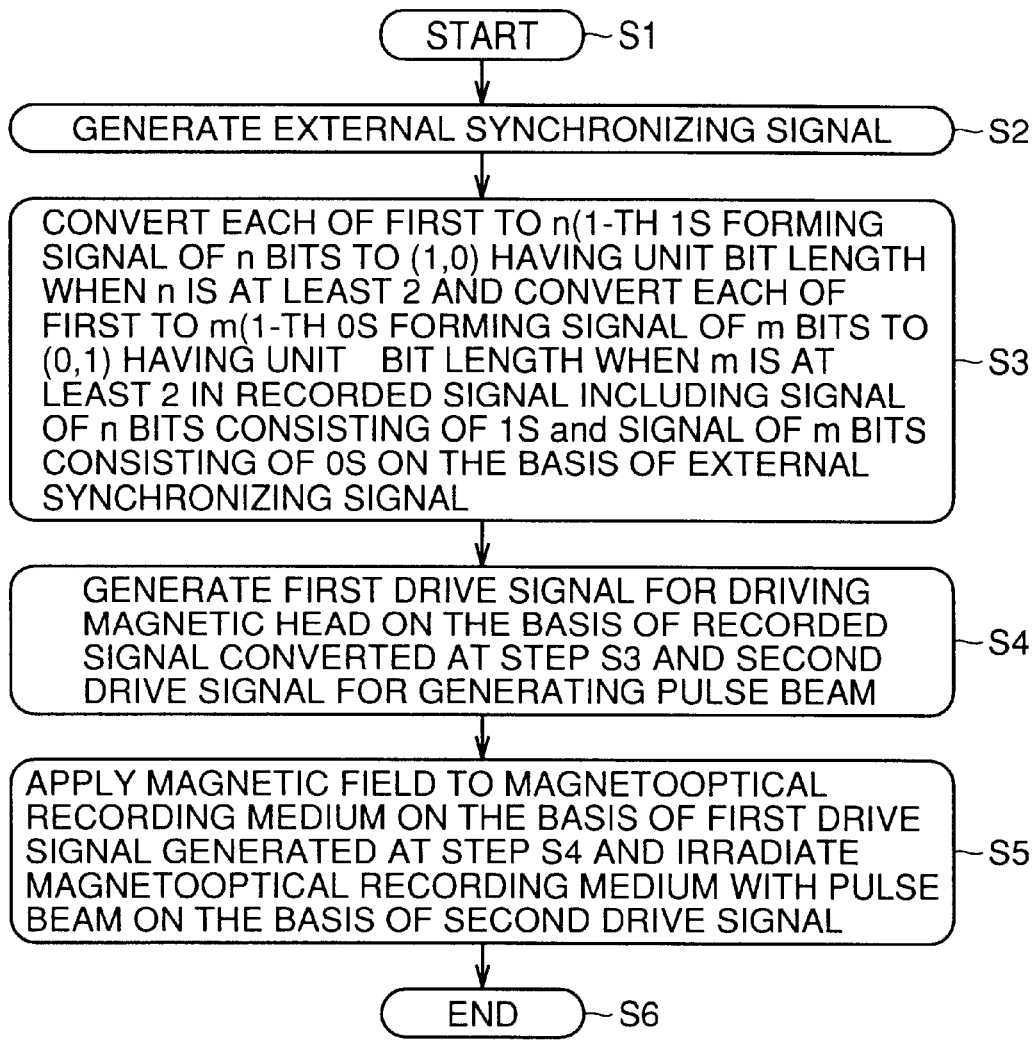
FIG. 11 is a flow chart of a signal recording method according to the present invention.

The signal recording method according to the present invention may be carried out in any other way so far as the same includes the step S3 in the flow chart shown in FIG. 11.

A flow chart of a signal reproducing method according to the present invention for applying the alternating magnetic field Hex along the direction having a constant angle with respect to the normal direction of the magnetooptical recording medium 100 to the boundaries between the magnetic domains is described with reference to FIG. 12. When signal reproduction is started (step Si), the external synchronizing signal (CK) is generated on the basis of the fine clock mark signal (FCM) detected with reference to the lands 103 or the grooves 104 formed on the magnetooptical recording medium 100 (step S2). The n drive signals for generating the alternating magnetic field Hex along the direction having a constant angle with respect to the normal direction of the magnetooptical recording medium 100 are generated by varying the phase of the external synchronizing signal (CK) (step S3). The alternating magnetic field Hex is applied to the magnetooptical recording medium 100 on the basis of the n drive signals generated at the step S3, the magnetooptical recording medium 100 is irradiated with the continuous laser beam for reproducing the signal (step S4) and the optimum drive signal minimizing the error rate of the reproduced signal is decided on the basis of the reproduced signal reproduced at the step S4 (step S5). The alternating magnetic field Hex is applied to the magnetooptical recording medium 100 on the basis of the optimum drive signal decided at the step S5 for reproducing the signal (step S6), and the signal reproduction is terminated (step S7).

Figure 12:
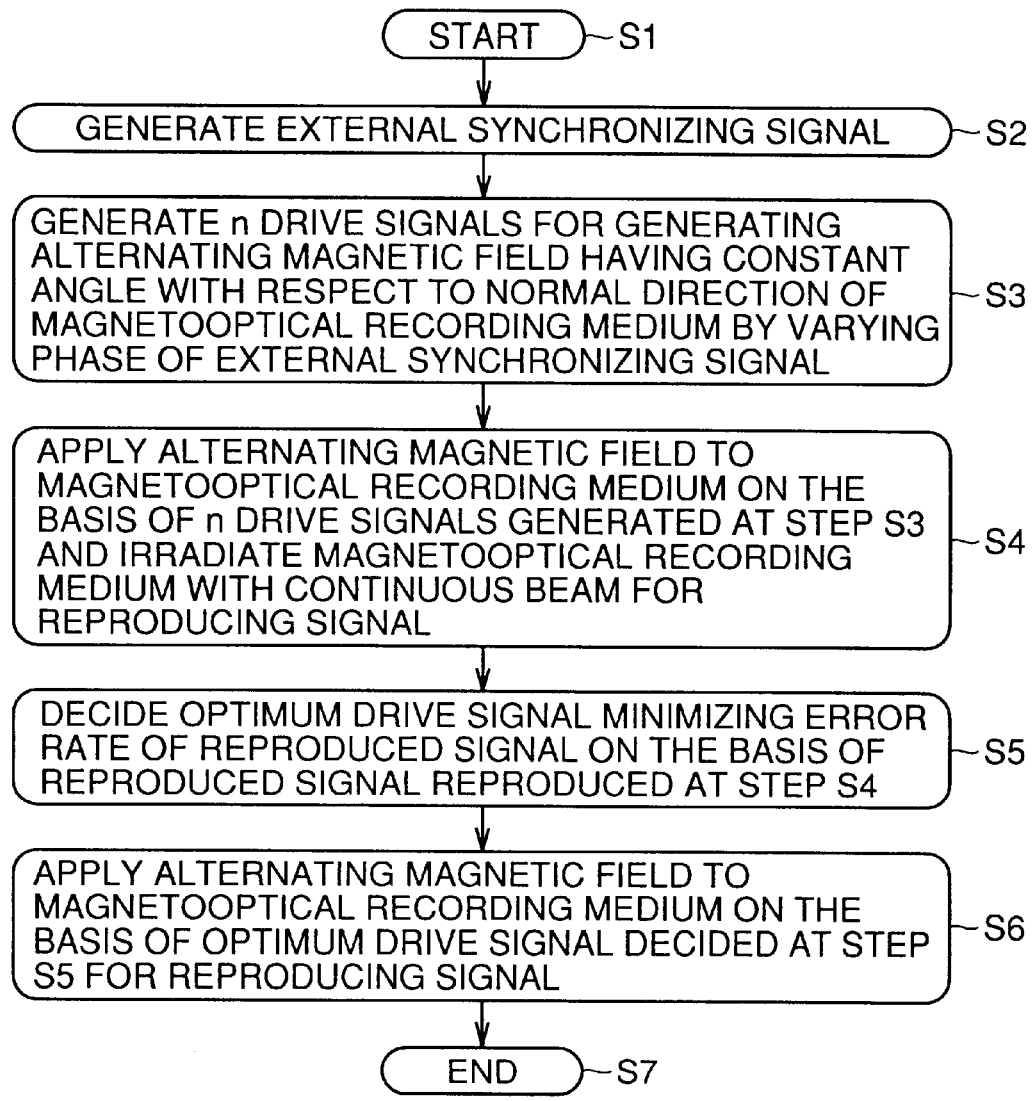
FIG. 12 is a flow chart of a signal reproducing method according to the present invention.
Figure 13A:
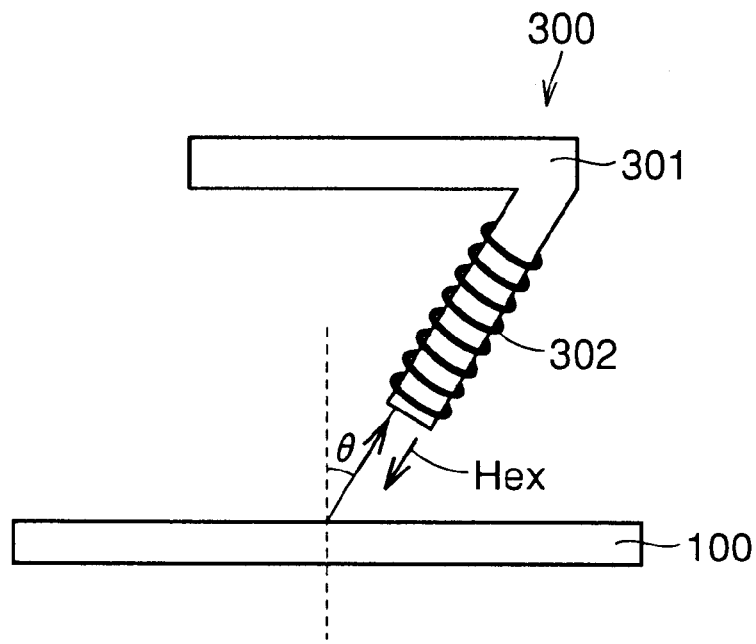
FIGS. 13A and 13B illustrate other exemplary magnetic heads generating the alternating magnetic field in the direction having the constant angle with respect to the normal direction of the magnetooptical recording medium 100.
Figure 13B:
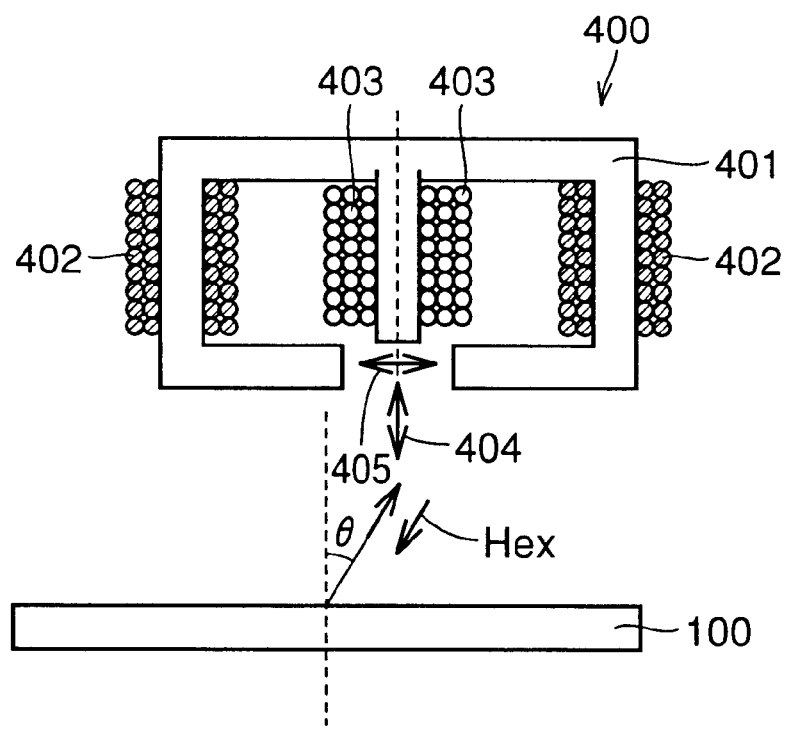
Figure 14A:
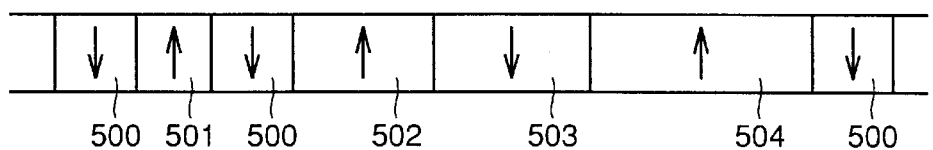
FIGS. 14A to 14C are diagrams for illustrating problems of the prior art.
Figure 14B:
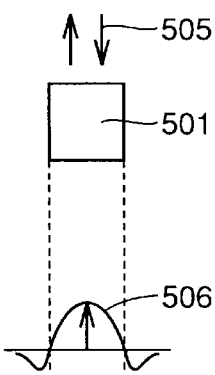
Figure 14C:
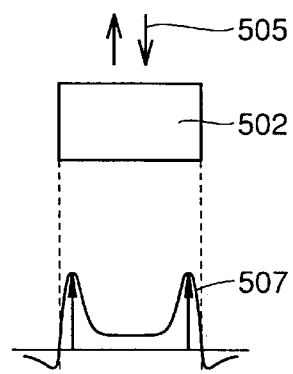

The signal reproducing method according to the present invention is not restricted to the flow chart shown in FIG. 12 but may be carried out in any other way so far as the same includes the step of deciding the drive signal for applying the alternating magnetic field Hex to the boundaries between the magnetic domains and the step of applying the alternating magnetic field Hex to the magnetooptical recording medium 100 on the basis of the decided drive signal The magnetic head for applying the alternating magnetic field Hex along the direction having a constant angle with respect to the normal direction of the magnetooptical recording medium 100 is not restricted to the magnetic head 260 shown in FIGS. 4 and 8 but may be replaced with a magnetic head 300 or 400 shown in FIG. 13A or 13B. The magnetic head 300, formed by a core 301 and a coil 302 wound on the core 301, can apply the alternating magnetic field Hex to the magnetooptical recording medium 100 by feeding currents having different directions to the coil 302. In this case, the alternating magnetic field Hex is applied to the magnetooptical recording medium 100 from a direction having a constant angle θ with respect to the normal direction of the magnetooptical recording medium 100.

The magnetic head 400 is formed by a core 401 and coils 402 and 403 wound on the core 401. A magnetic field 405 is generated by feeding currents having different directions to the coil 402, and a magnetic field 404 is generated by feeding currents having different directions to the coil 403. While the magnetic head 400 generates the magnetic field 404 perpendicular to the magnetooptical recording medium 100 and the magnetic field 405 along the in-plane direction of the magnetooptical recording medium 100 independently of each other, a composite magnetic field of the magnetic fields 404 and 405 is applied to the magnetooptical recording medium 100. Consequently, the alternating magnetic field Hex along the direction having the constant angle θ with respect to the normal direction of the magnetooptical recording medium 100 is applied to the magnetooptical recording medium 100.

In the present invention, the magnetic head applying the alternating magnetic field Hex along the direction having the constant angle θ with respect to the normal direction of the magnetooptical recording medium 100 is not restricted to the aforementioned magnetic heads 260, 300 and 400.

The magnetooptical disk unit according to the present invention includes that capable of carrying out the signal recording method and the signal reproducing method described above. In this case, the flow chart of signal recording and signal reproduction is defined by combining the flow charts shown in FIGS. 11 and 12 with each other. Thus, domains having different domain lengths can be reproduced through magnetic domain extension under constant reproducing conditions.

Figure 15:
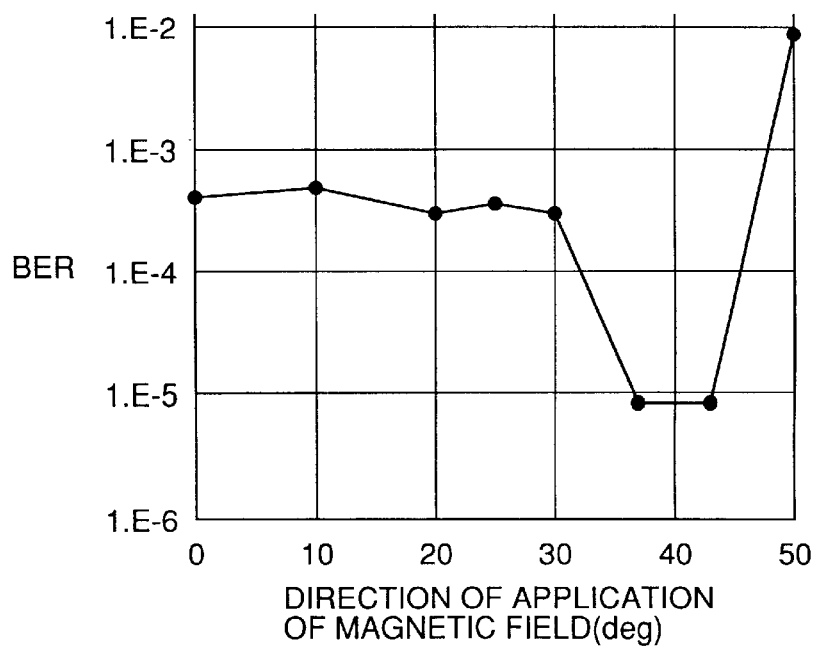
FIG. 15 shows the relation between the angle of the alternating magnetic field applied to the magnetooptical recording medium with respect to the normal direction of the magnetooptical recording medium and an error rate of the reproduced signal.

As hereinabove described, the alternating magnetic field having the constant angle θ with respect to the normal direction of the magnetooptical recording medium 100 is applied to the magnetooptical recording medium 100 for extensionally transferring the magnetic domains of the recording layer to the reproducing layer in the present invention, while the error rate of the reproduced signal has a relation shown in FIG. 15 to the angle θ of the applied alternating magnetic field. Referring to FIG. 15, a domain of 0.2 μm is employed as the recorded signal. The error rate of the reproduced signal is in the range of $3\times10^{-4}$ to $5\times10^{-4}$ when the angle θ of alternating magnetic field with respect to the normal direction of the magnetooptical recording medium 100 is in the range of 10 to 30°. However, the error rate is abruptly reduced when the angle θ exceeds 30°, and exhibits a value of $9\times10^{-6}$ when the angle θ is in the range of 37 to 43°.

When recorded in the magnetooptical recording medium 100, the signal is modulated in the (NRZI+) system. When reproduced from the magnetooptical recording medium 100, therefore, the reproduced signal detected by the extensional magnetic domain system is demodulated and subjected to error correction. In order to hold recording density at a high level and improve error correctability, the error rate of the reproduced signal must be kept below $10^{-4}$ in the current technique. Also when reproducing the signal by the magnetic field extension system, therefore, the error rate may be kept below $10^{-4}$. Consequently, the angle θ for reducing the error rate below $10^{-4}$ may be set in the range of 32 to 46° from the relation shown in FIG. 15.

Figure 16:
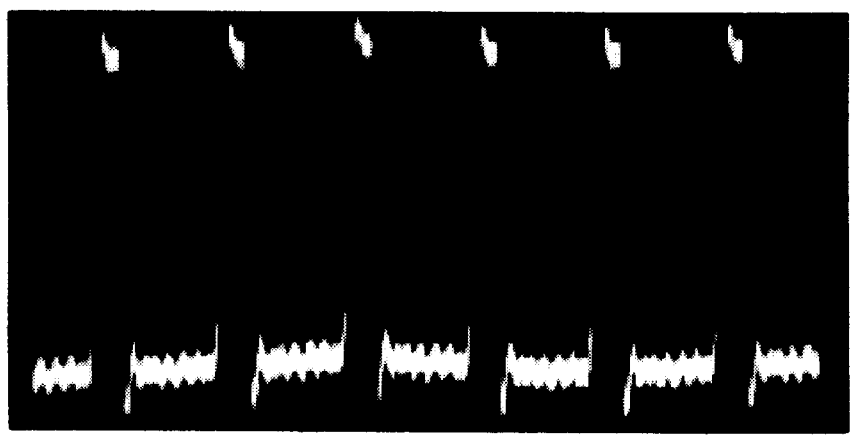
FIG. 16 shows the waveform of the reproduced signal obtained when the angle of the alternating magnetic field shown in FIG. 15 is 40°.
Figure 17:
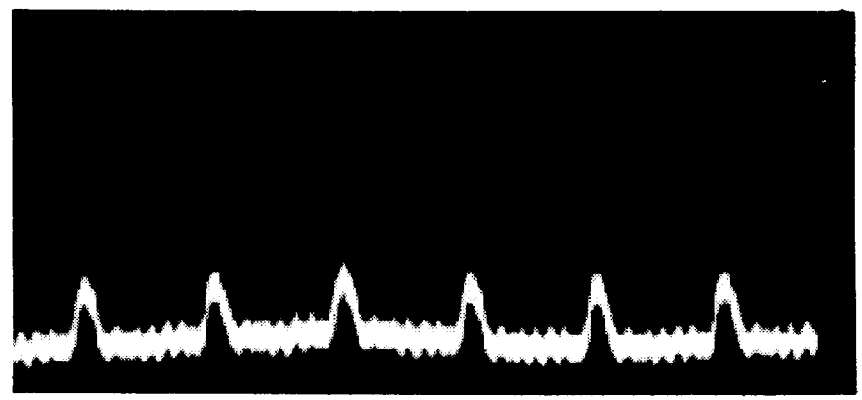
FIG. 17 shows the waveform of the reproduced signal obtained when the angle of the alternating magnetic field shown in FIG. 15 is 50°.

According to the present invention, therefore, the angle θ is set in the range of 32 to 46° for applying the alternating magnetic field to ends of the domains and extensionally transferring the magnetic domains from the recording layer to the reproducing layer thereby reproducing the signal. Preferably, the angle θ is set in the range of 37 to 43° for applying the alternating magnetic field to ends of the domains and extensionally transferring the magnetic domains from the recording layer to the reproducing layer thereby reproducing the signal. Thus, the error rate of the reproduced signal can be reduced to $9\times10^{-6}$. When the angle θ is increased to 50°, the error rate is abruptly increased for the following reason: An enlarged reproduced signal waveform is detected when the angle θ is 40° as shown in FIG. 16, while a waveform having small reproduced signal intensity is detected with no magnetic domain extension when the angle θ is 50° as shown in FIG. 17. Thus, it is conceivably difficult to extensionally transfer the magnetic domains from the recording layer to the reproducing layer and hence the error rate of the reproduced signal is increased when the angle θ is set in excess of 50°.

Figure 18:
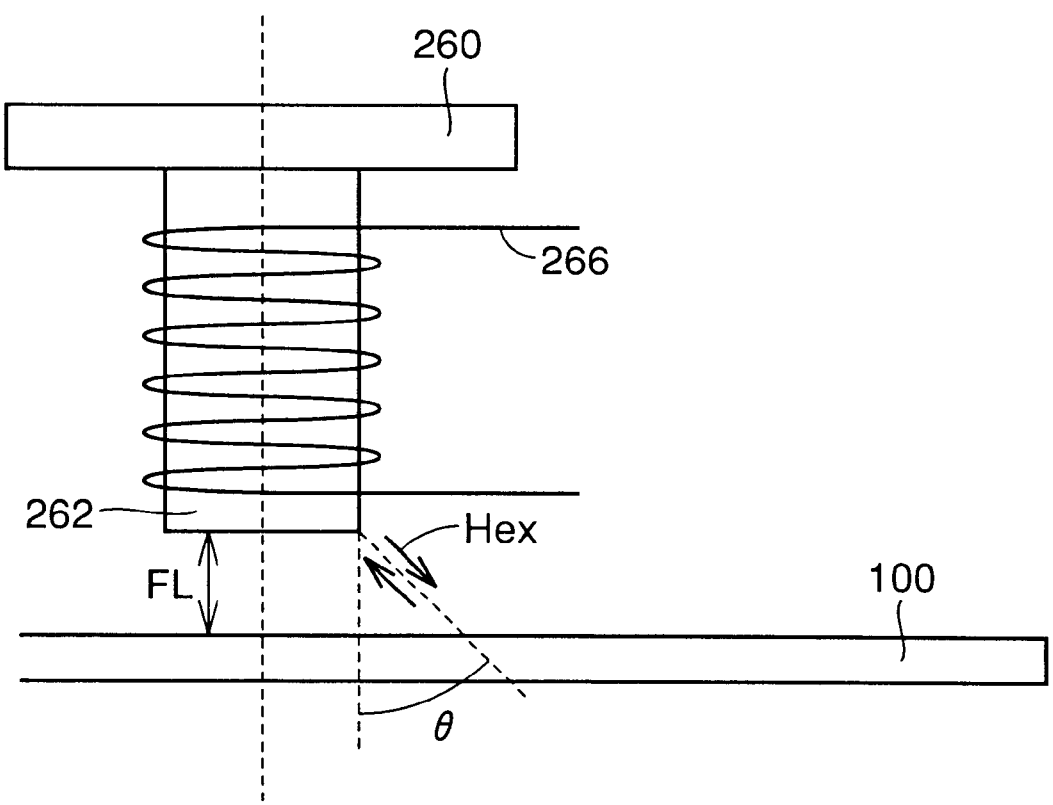
FIG. 18 is a diagram for illustrating the angle of the alternating magnetic field applied to the magnetooptical recording medium.

According to the present invention, the angle θ of the alternating magnetic field Hex applied to the magnetooptical recording medium 100 can be changed by moving the magnetic head 260 along the track direction of the magnetooptical recording medium 100 as shown in FIG. 18. The alternating magnetic field Hex is generated by changing the polarity of a current fed to a coil 266 wound on a core 262. The core 262 is 150 μm square, and the distance FL between the core 262 and the magnetooptical recording medium 100 is 20 μm. Therefore, the angle θ with respect to the normal direction of the magnetooptical recording medium 100 can be changed by moving the magnetic head 260 along the track direction of the magnetooptical recording medium 100. Thus, according to the present invention, the alternating magnetic field Hex is applied to the magnetooptical recording medium 100 while moving the magnetic head 260 along the track direction of the magnetooptical recording medium 100, for deciding the angle θ of the alternating magnetic field Hex on the basis of the error rate of the detected reproduced signal.

Figure 19A:
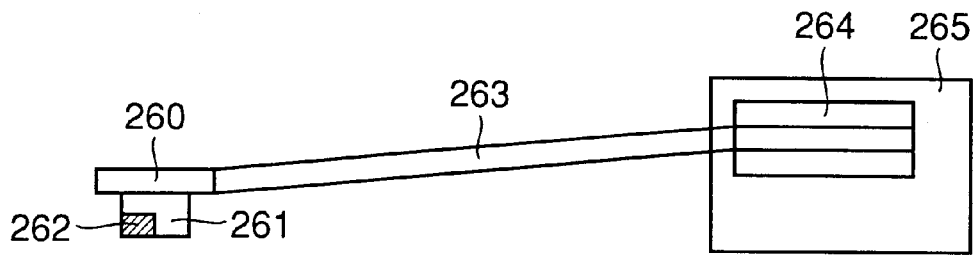
FIG. 19A is a sectional view for illustrating a mechanism of changing the angle of the alternating magnetic field applied to the magnetooptical recording medium.
Figure 19B:
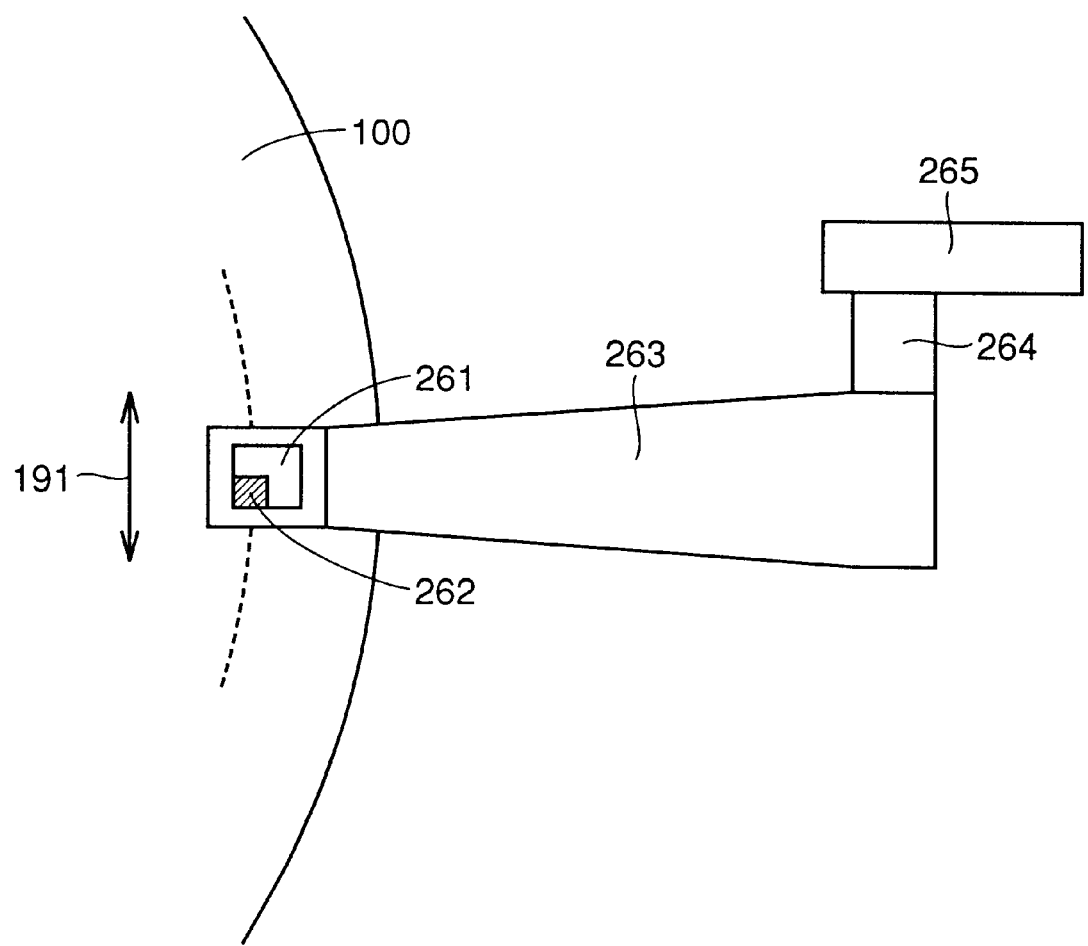
FIG. 19B is a plan view thereof.

A mechanism of moving the magnetic head 260 along the track direction of the magnetooptical recording medium 100 is described with reference to FIGS. 19A and 19B. The magnetic head 260 has the core 262 and a floating slider 261, and is coupled to a piezoelectric element 264 fixed to a base 265 through an arm 263. The slider 261 floats the magnetic head 260 through rotation of the magnetooptical recording medium 100. As shown in FIG. 19B, the base 265, the piezoelectric element 264 and the arm 263 are arranged along the track direction of the magnetooptical recording medium 100 shown by arrow 191, and the piezoelectric element 264 expands and contracts along the track direction 191 due to a voltage applied thereto. The piezoelectric element 264 thus expands and contracts along the track direction 191, so that the magnetic head 260 can slightly move along the track direction 191 of the magnetooptical recording medium 100.

Figure 20:
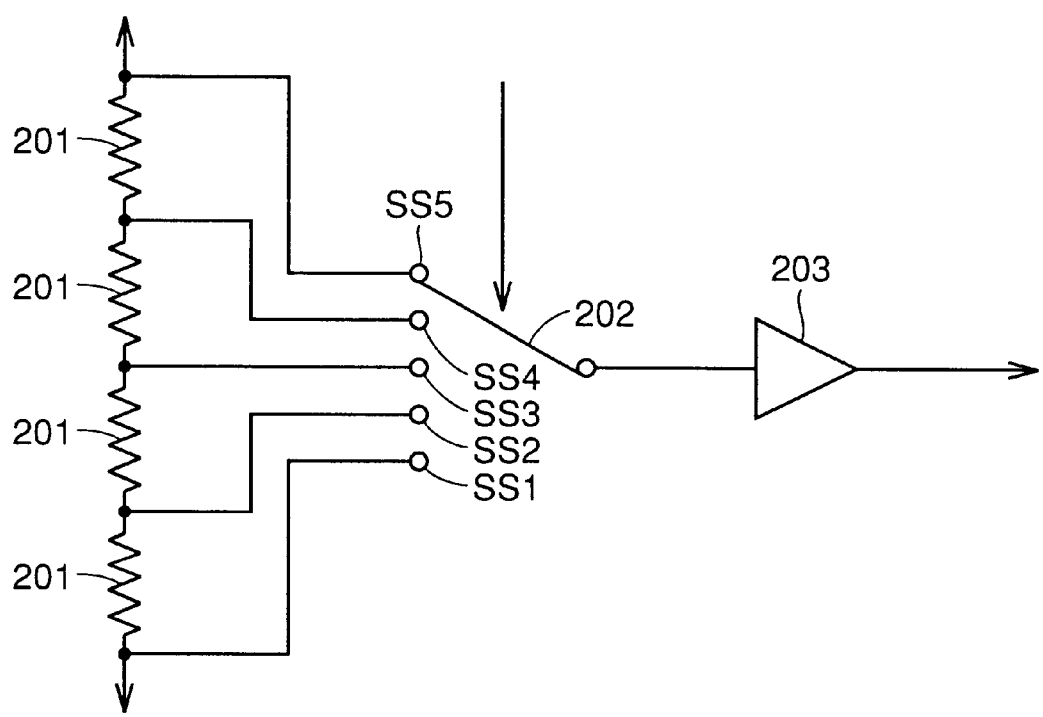
FIG. 20 shows a circuit outputting a voltage applied to a piezoelectric element.

FIG. 20 shows an exemplary circuit for applying the voltage to the piezoelectric element 264. Resistors 201 are serially connected and contacts SS1, SS2, SS3, SS4 and SS5 are connected with points having different resistance values, so that a switch 202 outputs different values of voltages through an amplifier 203. When connected to the contact SS3, the switch 202 outputs a voltage value "0" so that the piezoelectric element 264 does not expand or contract. The contacts SS1 and SS2 and the contacts SS4 and SS5 output voltages of different polarities for making the piezoelectric element 264 expand and contract respectively. Therefore, the circuit shown in FIG. 20 can output a voltage for making the piezoelectric element 264 expand and contract.

According to the present invention, the mechanism described with reference to FIGS. 19A, 19B and 20 slightly moves the magnetic head 260 along the track direction 191 of the magnetooptical recording medium 100 for deciding the angle 0 from the error rate of the reproduced signal reproduced by applying the alternating magnetic field Hex to the magnetooptical recording medium 100. The control circuit 200 of the magnetooptical disk unit shown in FIG. 4 controls the circuit shown in FIG. 20 to apply a voltage for making the piezoelectric element 264 expand or contract. The circuit shown in FIG. 20 connects the switch 202 to any of the contacts SS1, SS2, SS3, SS4 and SS5 for outputting a voltage having a prescribed polarity under control of the control circuit 200. Thus, the piezoelectric element 264 slightly expands and contracts along the track direction 191 of the magnetooptical recording medium 100. Therefore, the magnetic head 260 slightly moves along the track direction 191 of the magnetooptical recording medium 100, so that the alternating magnetic field Hex is applied to the magnetooptical recording medium 100 on each position of the magnetic head 260 and detecting the reproduced signal. The control circuit 200 calculates the error rate from the detected reproduced signal. The control circuit 200, previously storing the relation between the error rate of the reproduced signal and the angle θ of the alternating magnetic field Hex, detects the desired angle θ from the stored relation and controls the circuit shown in FIG. 20 to move the magnetic head 260 in the track direction 191 for attaining the angle θ. Thus, the circuit shown in FIG. 20 outputs a voltage for setting the angle θ of the alternating magnetic field Hex applied to the magnetooptical recording medium 100 to the desired value and applies the same to the piezoelectric element 264 for slightly moving the magnetic head 260 along the track direction of the magnetooptical recording medium 100, applying the alternating magnetic field Hex of the desired angle to the magnetooptical recording medium 100 and detecting the reproduced signal having a small error rate.

Figure 21:
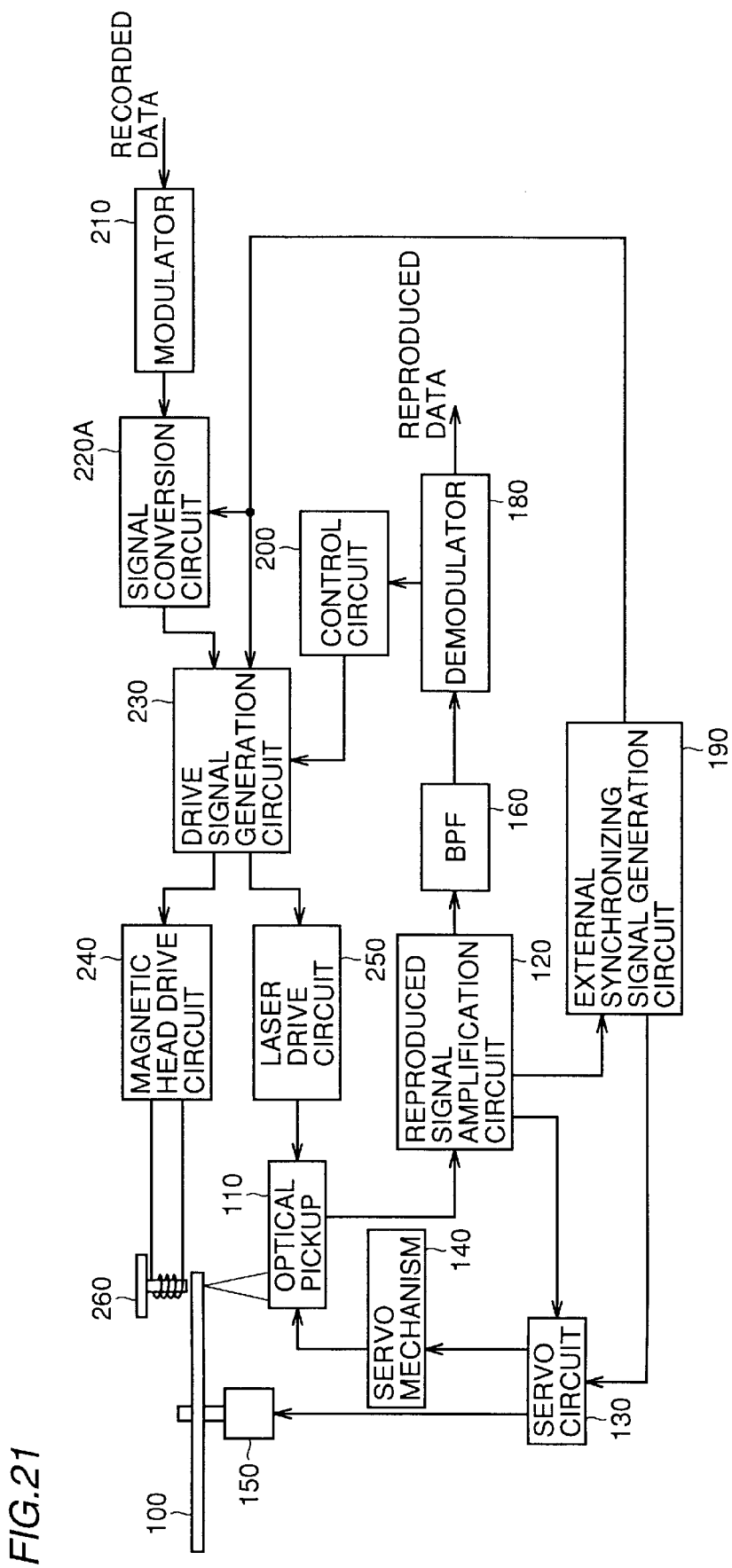
FIG. 21 is another block diagram of the magnetooptical magnetic disk unit according to the present invention.

The aforementioned magnetooptical disk unit according to the present invention may be replaced with a magnetooptical disk unit shown in FIG. 21. In the magnetooptical disk unit shown in FIG. 21, the signal conversion circuit 220 of the magnetooptical disk unit shown in FIG. 4 is replaced with a signal conversion circuit 220A. The remaining structure of the magnetooptical disk unit shown in FIG. 21 is identical to that of the magnetooptical disk unit shown in FIG. 4.

Figure 22:
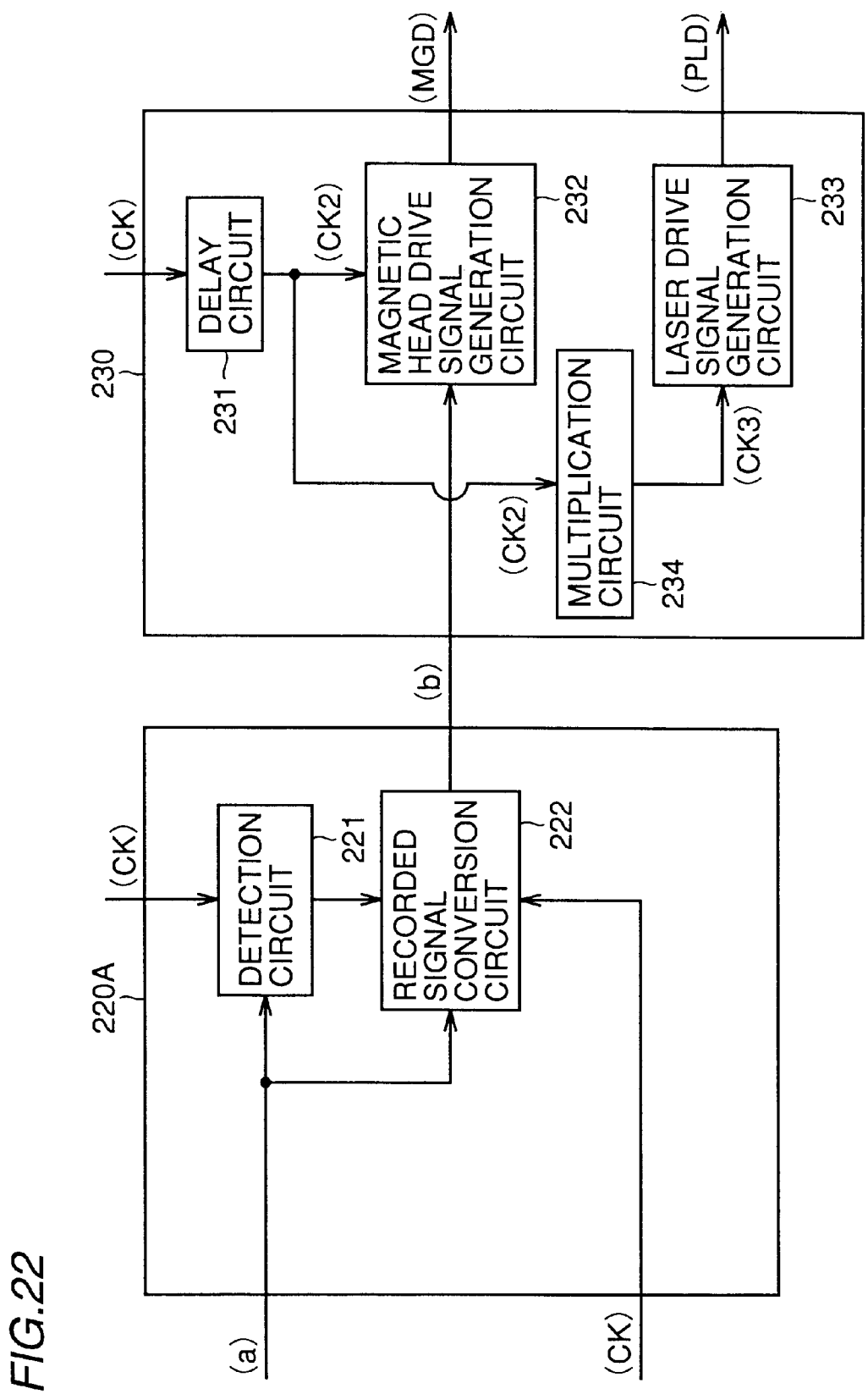
FIG. 22 is a schematic block diagram of a signal conversion circuit and a drive signal generation circuit of the magnetooptical disk unit shown in FIG. 21.

Referring to FIG. 22, the signal conversion circuit 220A includes a detection circuit 221 and a recorded signal conversion circuit 222.

Figure 23:
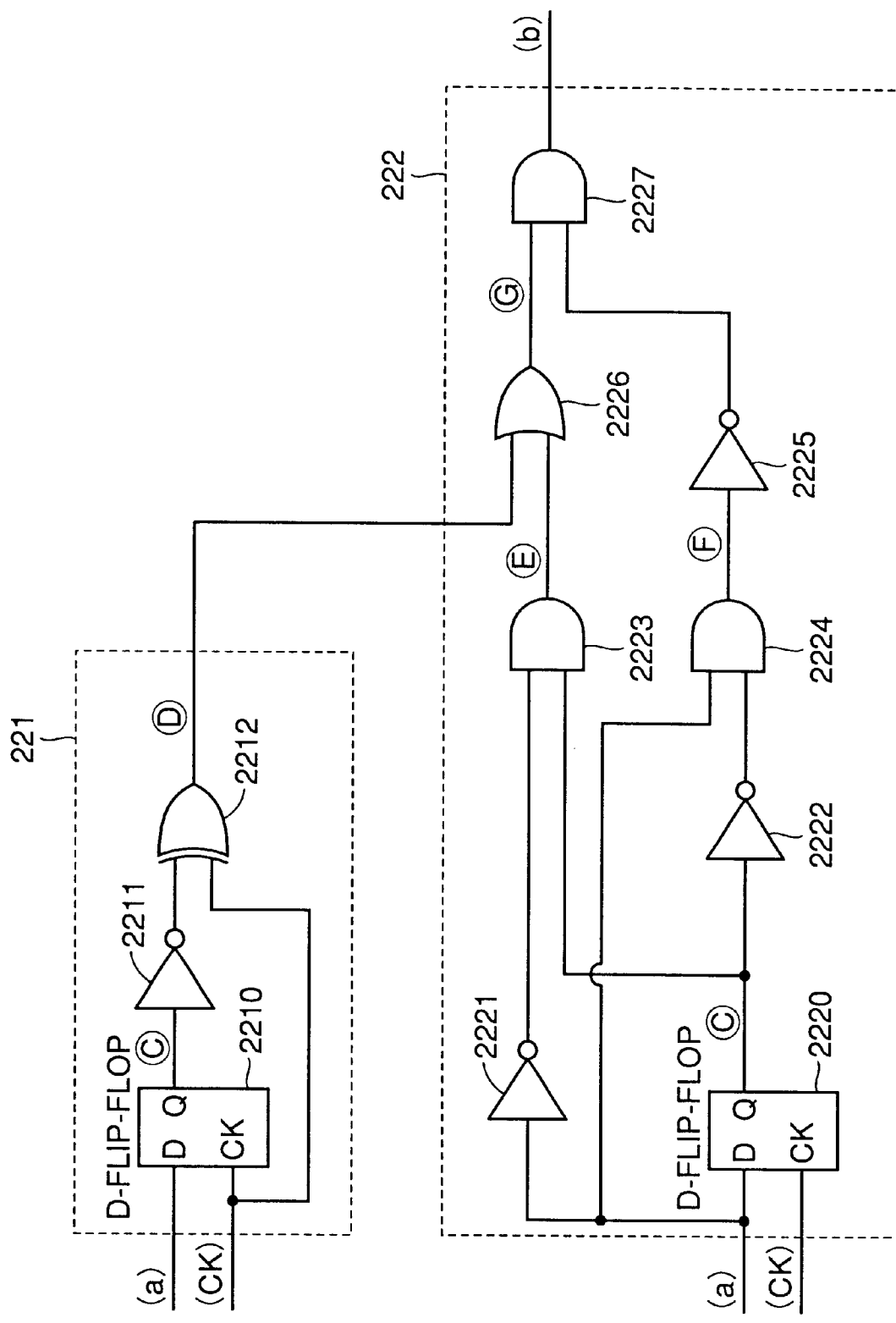
FIG. 23 is a circuit diagram of a detection circuit and a recorded signal conversion circuit shown in FIG. 22.

Referring to FIG. 23, the detection circuit 221 includes a flip-flop 2210, an inverter 2211 and an EX-OR gate 2212. The recorded signal conversion circuit 222 includes a flip-flop 2220, inverters 2221, 2222 and 2225, AND gates 2223, 2224 and 2227 and an OR gate 2226.

Figure 24:
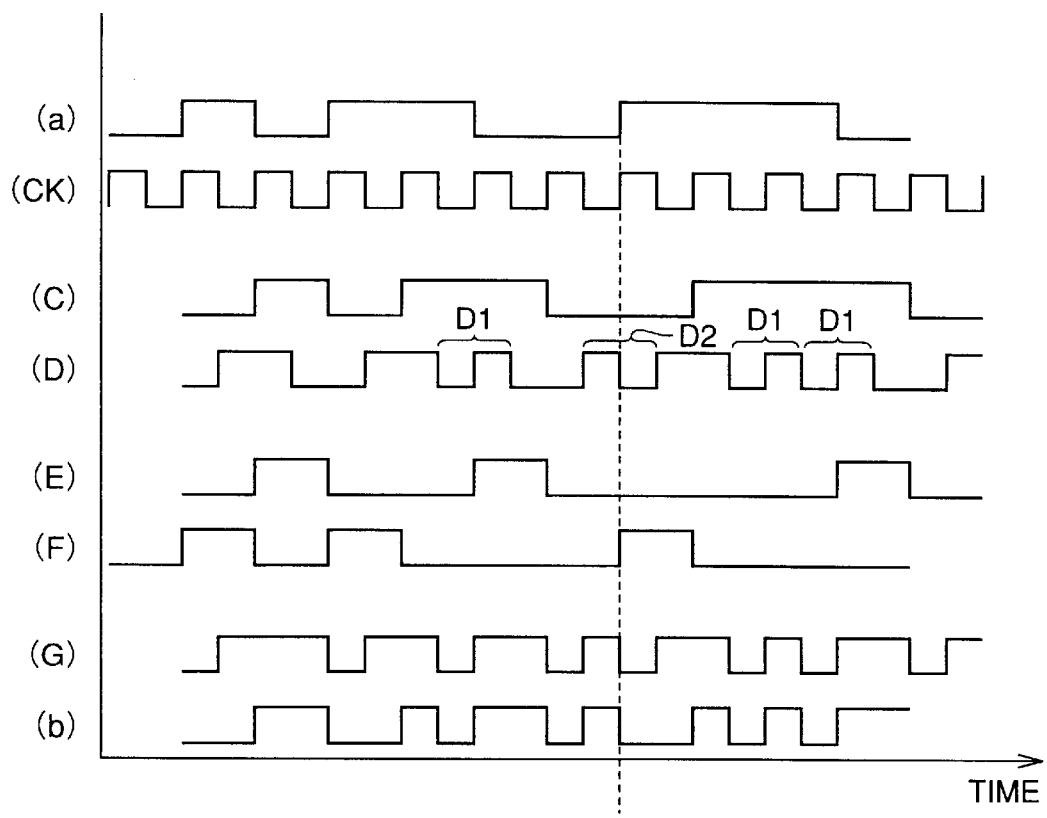
FIG. 24 is a timing chart of signals in the detection circuit and the recorded signal conversion circuit shown in FIG. 23.

Referring to FIGS. 23 and 24, the flip-flop 2210 of the detection circuit 221 receives a recorded signal (a) and outputs a signal (C) obtained by delaying the recorded signal (a) by a cycle of an external synchronizing signal (CK). The inverter 2211 inverts the signal (C). The EX-OR gate 2212 operates the exclusive OR of the inverted signal of the signal (C) and the external synchronizing signal (CK), and outputs a signal (D).

In the signal (D), a component D1 indicates continuation of "1" and a component D2 indicates continuation of "0". Therefore, the components D1 and D2 correspond to the detection signals 70 and 71 shown in FIG. 7 respectively.

The flip-flop 2220 of the recorded signal conversion circuit 222 receives the recorded signal (a) and outputs the signal (C) obtained by delaying the recorded signal (a) by one cycle of the external synchronizing signal (CK). The inverter 2221 inverts the recorded signal (a). The AND gate 2223 operates the AND of the inverted signal of the recorded signal (a) and the signal (C), and outputs a signal (E).

The inverter 2222 inverts the signal (C). The AND gate 2224 operates the AND of the recorded signal (a) and the inverted signal of the signal (C), and outputs a signal (F). The inverter 2225 inverts the signal (F). The OR gate 2226 operates the OR of the signal (D) from the detection circuit 221 and the signal (E), and outputs a signal (G). The AND gate 2227 operates the AND of the inverted signal of the signal (F) and the signal (G), and outputs a signal (b) The signal (b) is "0,1,0,10,1,01,0,10,10, 1", where "10" indicates conversion of a unit-bit signal "1" to a signal "10" having a unit bit length, and "01" indicates conversion of a unit-bit signal "0" to a signal "01" having a unit bit length. The recorded signal (a) is "0,1,0,1,1,0,0,1,1,1". As compared with the recorded signal (b), the signal "1" of the fourth bit, the signal "1" of the eighth bit and the signal "1" of the ninth bit are converted to signals "10" having the unit bit length, and the signal "0" of the sixth bit is converted to a signal "01" having the unit bit length.

Thus, signals "1" or "0" continuous in a recorded signal can be converted to signals "10" or "01" having the unit bit length except the last signal "1" or "0".

The converted signal(b) is output to a magnetic head drive signal generation circuit 232 of a drive signal generation circuit 230, so that a magnetic head drive signal is generated and recorded in a magnetooptical recording medium 100 as a magnetooptical signal as described above.

Signal recording in the magnetooptical disk unit shown in FIG. 21 is identical to that in the magnetooptical disk unit shown in FIG. 4 except the operations in the aforementioned signal conversion circuit 220A. Signal reproduction in the magnetooptical disk unit shown in FIG. 21 is identical to that in the magnetooptical disk unit shown in FIG. 4.

The magnetooptical disk unit employing the signal conversion circuit 220A can also reproduce a signal under the same reproducing conditions regardless of domain lengths.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetooptical disk unit for recording a recorded signal having a signal of n bits consisting of 1s and a signal of m bits consisting of 0s arranged in a prescribed system in a magnetooptical recording medium, said magnetooptical disk unit including:

a signal conversion circuit converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2.

2. A magnetooptical disk unit recording a recorded signal having a signal of n bits consisting of is and a signal of m bits consisting of 0s arranged in a prescribed system in a magnetooptical recording medium, said magnetooptical disk unit including:

a magnetic head applying a magnetic field to said magnetooptical recording medium;

a signal conversion circuit converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2; and a drive signal generation circuit generating a drive signal for driving said magnetic head in response to an output signal from said signal conversion circuit.

3. A magnetooptical disk unit recording a recorded signal having a signal of n bits consisting of 1s and a signal of m bits consisting of 0s arranged in a prescribed system in a magnetooptical recording medium, said magnetooptical disk unit including:

a magnetic head applying a magnetic field to said magnetooptical recording medium;

a detection circuit detecting 1 or 0 from said recorded signal and outputting a first detection signal corresponding to 1 and a second detection signal corresponding to 0;

a signal conversion circuit converting each of first to n−1-th 1s forming said signal of n bits to (1,0) having a unit bit length when said detection circuit continuously outputs said first detection signal n times (n≧2), and converting each of first to n−1-th 0s forming said signal of m bits to (0,1) having a unit bit length when said detection circuit continuously outputs said second detection signal m times (m≧2); and a drive signal generation circuit generating a drive signal for driving said magnetic head in response to an output signal from said signal conversion circuit.

4. A magnetooptical disk unit recording a recorded signal having a signal of n bits consisting of 1s and a signal of m bits consisting of 0s arranged in a prescribed system in a magnetooptical recording medium, said magnetooptical disk unit including:
- a magnetic head applying a magnetic field to said magnetooptical recording medium;
- an external synchronizing signal generation circuit generating an external synchronizing signal on the basis of a shape formed on said magnetooptical recording medium;
- a timing signal generation circuit generating a first timing signal synchronous with said external synchronizing signal generated by said external synchronizing signal generation circuit and a second timing signal formed by delaying the phase of said external synchronizing signal by a prescribed cycle;
- a detection circuit detecting 1 or 0 from said recorded signal in synchronization with said first timing signal generated by said timing signal generation circuit and outputting a first detection signal corresponding to 1 and a second detection signal corresponding to 0;
- a signal conversion circuit converting each of first to n−1-th 1s forming said signal of n bits to (1,0) having a unit bit length in synchronization with said second timing signal from said timing signal generation circuit when said detection circuit continuously outputs said first detection signal n times (n≧2), and converting each of first to m−1-th 0s forming said signal of m bits to (0,1) having a unit bit length in synchronization with said second timing signal from said timing signal generation circuit when said detection circuit continuously outputs said second detection signal m times (m≧2); and
- a drive signal generation circuit generating a drive signal for driving said magnetic head in response to an output signal from said signal conversion circuit.

5. A magnetooptical disk unit recording a recorded signal having a signal of n bits consisting of 1s and a signal of m bits consisting of 0s arranged in a prescribed system in a magnetooptical recording medium, said magnetooptical disk unit including:
- an optical pickup irradiating said magnetooptical recording medium with a pulse beam;
- a magnetic head applying a magnetic field to said magnetooptical recording medium;
- an external synchronizing signal generation circuit generating an external synchronizing signal on the basis of a shape formed on said magnetooptical recording medium;
- a timing signal generation circuit generating a first timing signal synchronous with said external synchronizing signal generated by said external synchronizing signal generation circuit and a second timing signal formed by delaying the phase of said external synchronizing signal by a prescribed cycle;
- a detection circuit detecting 1 or 0 from said recorded signal in synchronization with said first timing signal generated by said timing signal generation circuit and outputting a first detection signal corresponding to 1 and a second detection signal corresponding to 0;
- a signal conversion circuit converting each of first to n−1-th 1s forming said signal of n bits to (1,0) having a unit bit length in synchronization with said second timing signal from said timing signal generation circuit when said detection circuit continuously outputs said first detection signal n times (n≧2), and converting each of first to m−1-th 0s forming said signal of m bits to (0,1) having a unit bit length in synchronization with said second timing signal from said timing signal generation circuit when said detection circuit continuously outputs said second detection signal m times (m≧2); and
- a drive signal generation circuit generating a drive signal for driving said magnetic head in response to an output signal from said signal conversion circuit and generating a second drive signal for emitting said pulse beam from said optical pickup.

6. A magnetooptical disk unit reproducing a signal from a magnetooptical recording medium recording a recorded signal having a signal of n bits consisting of 1s and a signal of m bits consisting of 0s arranged in a prescribed system
- by converting each of first to n−1-th 1s forming said signal of n bits to (1,0) having a unit bit length when said n is at least 2, and
- converting each of first to m−1-th 0s forming said signal of m bits to (0,1) having a unit bit length when said m is at least 2, said magnetooptical disk unit including:
  - a magnetic head applying an alternating magnetic field at least including a magnetic field component along the in-plane direction of said magnetooptical recording medium to said magnetooptical recording medium; and
  - a drive signal generation circuit generating a drive signal for applying said alternating magnetic field around a boundary between domains formed on said magnetooptical recording medium on the basis of said recorded signal.

7. A magnetooptical disk unit reproducing a signal from a magnetooptical recording medium recording a recorded signal having a signal of n bits consisting of 1s and a signal of m bits consisting of 0s arranged in a prescribed system
- by converting each of first to n−1-th 1s forming said signal of n bits to (1,0) having a unit bit length when said n is at least 2, and
- converting each of first to m−1-th 0s forming said signal of m bits to (0,1) having a unit bit length when said m is at least 2, said magnetooptical disk unit including:
  - a magnetic head applying an alternating magnetic field at least including a magnetic field component along the in-plane direction of said magnetooptical recording medium to said magnetooptical recording medium;
  - an external synchronizing signal generation circuit generating an external synchronizing signal on the basis of a shape formed on said magnetooptical recording medium;
  - a drive signal generation circuit generating n drive signals for forming said alternating magnetic field varied in phase difference with respect to said external synchronizing signal on the basis of said external synchronizing signal from said external synchronizing signal generation circuit; and
  - a control circuit deciding an optimum drive signal from a reproduced signal reproduced by said magnetic head by applying said alternating magnetic field to said magnetooptical recording medium on the basis of said n drive signals from said drive signal generation circuit for generating said alternating magnetic field minimizing an error rate of said reproduced signal.

8. A signal recording method of recording a recorded signal having a signal of n bits consisting of 1s and a signal of m bits consisting of 0s arranged in a prescribed system in a magnetooptical recording medium, including a step of:

converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2.

9. A signal recording method of recording a recorded signal having a signal of n bits consisting of 1s and a signal of m bits consisting of 0s arranged in a prescribed system in a magnetooptical recording medium, including:

a first step of converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2; and a second step of driving a magnetic head applying a magnetic field to said magnetooptical recording medium on the basis of said recorded signal converted in said first step.

10. A signal reproducing method of reproducing a signal from a magnetooptical recording medium recording a recorded signal having a signal of n bits consisting of 1s and a signal of m bits consisting of 0s arranged in a prescribed system by converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2, said signal reproducing method including:

a first step of generating a drive signal for applying an alternating magnetic field at least including a magnetic field component along the in-plane direction of said magnetooptical recording medium around a boundary between domains formed on said magnetooptical recording medium on the basis of said recorded signal; and second step of applying said alternating magnetic field to said magnetooptical recording medium on the basis of said drive signal generated in said first step.

11. A signal reproducing method of reproducing a signal from a magnetooptical recording medium recording a recorded signal having a signal of n bits consisting of 1s and a signal of m bits consisting of 0s arranged in a prescribed system by converting each of first to n−1-th 1s forming said signal of n bits to (1,0) having a unit bit length when said n is at least 2, and converting each of first to m−1-th 0s forming said signal of m bits to (0,1) having a unit bit length when said m is at least 2, said signal reproducing method including:

a first step of generating an external synchronizing signal on the basis of a shape formed on said magnetooptical recording medium;

a second step of generating n drive signals for applying an alternating magnetic field at least including a magnetic field component along the in-plane direction of said magnetooptical recording medium by varying the phase of said external synchronizing signal generated in said first step; and a third step of deciding an optimum drive signal from a reproduced signal reproduced by said magnetic head by applying said alternating magnetic field to said magnetooptical recording medium on the basis of said n drive signals generated in said second step for generating said alternating magnetic field minimizing an error rate of said reproduced signal, for applying said alternating magnetic field to said magnetooptical recording medium on the basis of said optimum drive signal decided in said third step thereby reproducing said signal.

12. A magnetooptical disk unit reproducing a signal from a magnetooptical recording medium recording a recorded signal having a signal of n bits consisting of 1s and a signal of m bits consisting of 0s arranged in a prescribed system by converting each of first to n−1-th 1s forming said signal of n bits (1,0) having a unit bit length when said n is at least 2, and converting each of first to m−1-th 0s forming said signal of m bits to (0,1) having a unit bit length when said m is at least 2, said magnetooptical disk unit including:

a magnetic head applying an alternating magnetic field having a prescribed angle $\theta$ with respect to the normal direction of said magnetooptical recording medium to said magnetooptical recording medium;

a drive signal generation circuit generating a drive signal for applying said alternating magnetic field around a boundary between domains formed on said magnetooptical recording medium on the basis of said recorded signal; and a magnetic head moving mechanism moving said magnetic head to the track direction of said magnetooptical recording medium so that said angle $\theta$ of said alternating magnetic field is in the range of 32 to 46°.

13. The magnetooptical disk unit according to claim 12, wherein said angle $\theta$ of said alternating magnetic field is in the range of 37 to 43°.

\* \* \* \* \*